US012251942B2

(12) United States Patent
Hagiwara et al.

(10) Patent No.: US 12,251,942 B2
(45) Date of Patent: Mar. 18, 2025

(54) LIQUID EJECTING APPARATUS AND LIQUID EJECTING METHOD

(71) Applicant: SEIKO EPSON CORPORATION, Tokyo (JP)

(72) Inventors: Hiroyuki Hagiwara, Matsumoto (JP); Noriaki Okazawa, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 106 days.

(21) Appl. No.: 18/074,866

(22) Filed: Dec. 5, 2022

(65) Prior Publication Data

US 2023/0173821 A1 Jun. 8, 2023

(30) Foreign Application Priority Data

Dec. 6, 2021 (JP) ................................ 2021-197579

(51) Int. Cl.

*B41J 2/18* (2006.01)
*B41J 25/316* (2006.01)
*B41J 2/175* (2006.01)

(52) U.S. Cl.

CPC ............... *B41J 2/18* (2013.01); *B41J 25/316* (2013.01); *B41J 2/17503* (2013.01); *B41J 2202/12* (2013.01); *B41J 2202/20* (2013.01)

(58) Field of Classification Search

CPC ........ B41J 2/18; B41J 25/316; B41J 2/17503; B41J 2202/12; B41J 2202/20
See application file for complete search history.

(56) References Cited

U.S. PATENT DOCUMENTS 9,994,024 B2 * 6/2018 Takino ................. B41J 2/16588
2020/0101733 A1 4/2020 Hagiwara et al.

FOREIGN PATENT DOCUMENTS

JP 2020-049874 A 4/2020

* cited by examiner

*Primary Examiner* — Geoffrey S Mruk
(74) *Attorney, Agent, or Firm* — Harness, Dickey & Pierce, P.L.C.

(57) ABSTRACT

A liquid ejecting apparatus includes: a liquid ejecting head including an ejecting surface configured to eject a liquid; a tank that reserves the liquid to be supplied to the liquid ejecting head; a circulating mechanism that executes a circulating operation to circulate the liquid between the liquid ejecting head and the tank; and a control unit that controls the circulating mechanism. The control unit executes a recording operation by the liquid ejecting head in a first posture in which the ejecting surface crosses a horizontal plane and executes the circulating operation in a second posture in which an angle made by the ejecting surface and the horizontal plane is smaller than the angle in the first posture.

14 Claims, 16 Drawing Sheets

LIQUID EJECTING APPARATUS AND LIQUID EJECTING METHOD

The present application is based on, and claims priority from JP Application Serial Number 2021-197579, filed Dec. 6, 2021, the disclosure of which is hereby incorporated by reference herein in its entirety.

BACKGROUND

1. Technical Field

The present disclosure relates to a liquid ejecting apparatus and a liquid ejecting method.

2. Related Art

For example, a liquid ejecting apparatus includes multiple head chips that eject a liquid. The head chips each have a common liquid chamber communicating with multiple nozzles. The liquid ejecting apparatus includes a circulating flow channel to circulate the liquid that is not discharged from the nozzles. The liquid not discharged from the nozzles is discharged from the common liquid chamber to pass through a flow channel outside the head chip thereafter and is supplied into the common liquid chamber again. In a liquid ejecting apparatus described in JP-A-2020-49874, multiple head chips are arranged such that the directions of flows of a liquid in common liquid chambers of adjacent two head chips are opposite to each other.

For example, there has been a liquid ejecting apparatus in which a head chip is arranged such that the direction of a nozzle surface provided with multiple nozzles crosses a horizontal plane and a recording operation is performed by ejecting a liquid from the nozzles. When the liquid passing through a common liquid chamber is circulated while the head chip is arranged as described above, the direction of the flow of the liquid in the common liquid chamber may be opposite to the gravity direction. When the direction of the flow of the liquid in the common liquid chamber is opposite to the gravity direction, the direction of the buoyancy acting on air bubbles and the direction of the flow of the liquid are opposite to each other, and the air bubbles are less likely to be discharged from the common liquid chamber. If there are air bubbles in the common liquid chamber, there is a problem that the air bubbles affect the liquid ejection from the nozzles during the subsequent recording operation.

SUMMARY

A liquid ejecting apparatus according to an aspect of the present disclosure includes: a liquid ejecting head that includes an ejecting surface to eject a liquid; a tank that reserves the liquid to be supplied to the liquid ejecting head; a circulating mechanism that executes a circulating operation to circulate the liquid between the liquid ejecting head and the tank; and a control unit that controls the circulating mechanism. The control unit executes a recording operation by the liquid ejecting head in a first posture in which the ejecting surface crosses a horizontal plane and executes the circulating operation in a second posture in which an angle made by the ejecting surface and the horizontal plane is smaller than the angle in the first posture.

A liquid ejecting method according to another aspect of the present disclosure includes: executing a recording operation by supplying a liquid ejecting head with a liquid from a tank reserving the liquid and ejecting the liquid from an ejecting surface of the liquid ejecting head; and executing a circulating operation to circulate the liquid between the liquid ejecting head and the tank. The executing of the recording operation is to execute the recording operation by the liquid ejecting head in a first posture in which the ejecting surface crosses a horizontal plane. The executing of the circulating operation is to execute the circulating operation in a second posture in which an angle made by the ejecting surface and the horizontal plane is smaller than the angle in the first posture.

DESCRIPTION OF EXEMPLARY EMBODIMENTS

Figure 1:
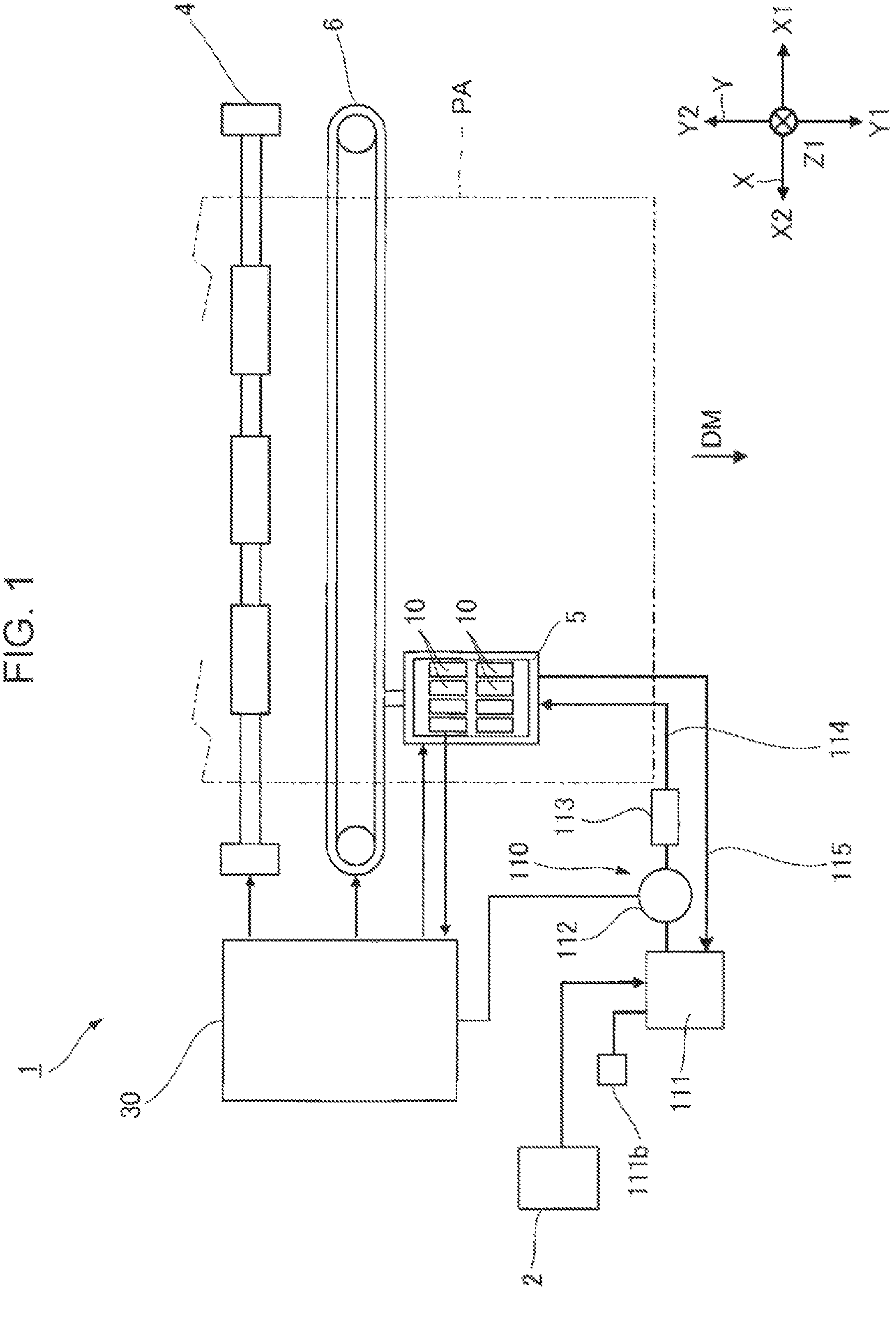
FIG. 1 is a schematic diagram illustrating a liquid ejecting apparatus according to Embodiment 1.

Embodiments of the present disclosure are described below with reference to the drawings. In the drawings, the dimension and scale of each portion may be appropriately different from actual dimension and scale. The embodiments described below are favorable specific examples of the present disclosure, and thus there are various limitations that are technically favorable; however, the scope of the present disclosure is not limited to those modes unless there is otherwise stated in the following descriptions that the present disclosure is particularly limited.

In the following descriptions, three directions crossing each other may be described as an X-axis direction, a Y-axis direction, and a Z-axis direction. The X-axis direction includes an X1 direction and an X2 direction that are directions opposite to each other. The Y-axis direction includes a Y1 direction and a Y2 direction that are directions opposite to each other. The Z-axis direction includes a Z1 direction and a Z2 direction that are directions opposite to each other. The X-axis direction, the Y-axis direction, and the Z-axis direction are orthogonal to each other. The Z1 direction is along an ejecting direction. The X-axis direction, the Y-axis direction, and the Z-axis direction are based on a posture of a liquid ejecting head 10. As described later, the X-axis direction, the Y-axis direction, and the Z-axis direction can be changed with respect to a gravity direction G1 in accordance with a posture change in the liquid ejecting head 10.

Figure 4:
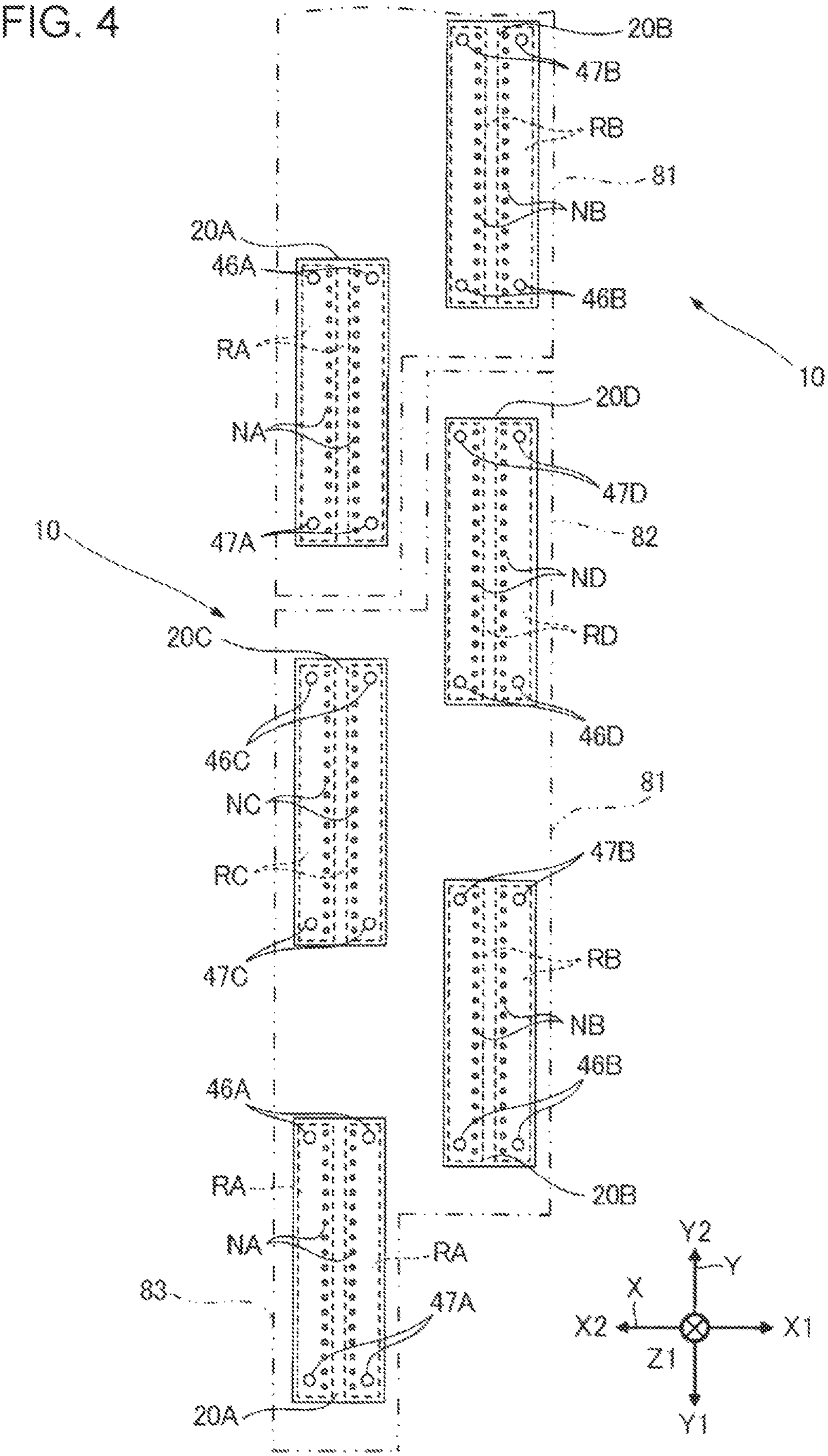
FIG. 4 is a schematic diagram illustrating arrangement of multiple head chips.

In the drawings, the X-axis direction, the Y-axis direction, and the Z-axis direction are indicated by arrows; however, when the posture of the liquid ejecting head 10 is changed, arrangement of parts other than the liquid ejecting head 10 may not correspond to the X-axis direction, the Y-axis direction, and the Z-axis direction. In the schematic diagrams such as FIGS. 1 and 2, the arrangement may not correspond to actual arrangement. For example, multiple head chips 20 are illustrated away from each other in the Y-axis direction in FIG. 2; however, the multiple head chips 20 are partially overlapped with each other when viewed in the X-axis direction as illustrated in FIG. 4. Since other drawings are also illustrated schematically, the shape may be different from the reality. The positional relationship between parts may not correspond completely to the actual positional relationship as well.

Figure 2:
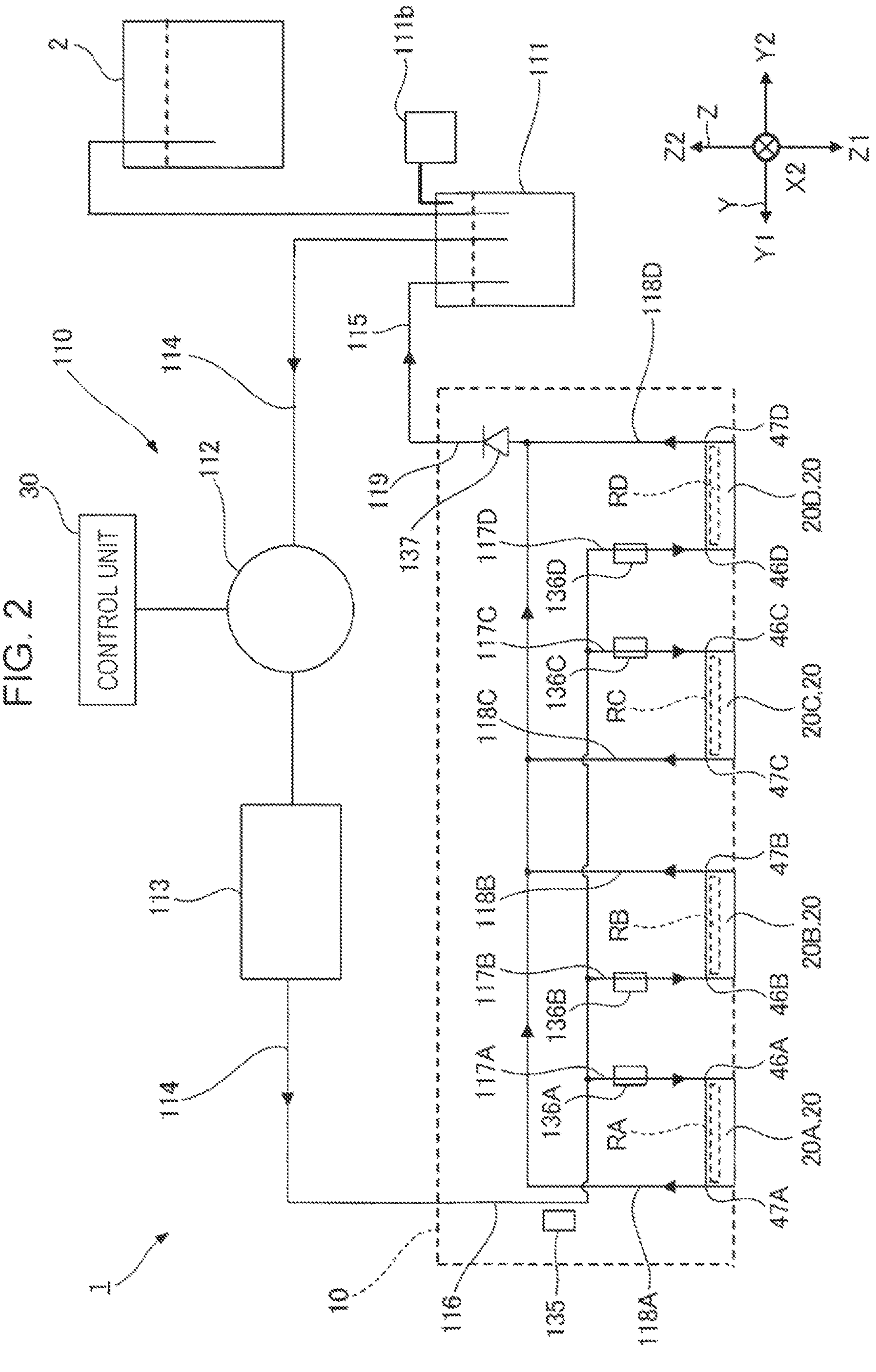
FIG. 2 is a schematic diagram illustrating an ink flow channel in the liquid ejecting apparatus.

FIG. 1 is a schematic diagram illustrating a liquid ejecting apparatus 1 according to Embodiment 1. FIG. 2 is a schematic diagram illustrating an ink flow channel in the liquid ejecting apparatus 1. The liquid ejecting apparatus 1 is an ink jet type printing apparatus that ejects ink, which is an example of a "liquid", onto a medium PA as an ink droplet. The liquid ejecting apparatus 1 is a serial type printing apparatus, for example. The liquid ejecting head 10 ejects the ink onto the medium PA while moving in a width direction of the medium PA. The medium PA is typically a print sheet. The medium PA is not limited to a print sheet and, for example, may be a printing target of an arbitrary material such as a resin film or a fabric.

The liquid ejecting apparatus 1 includes multiple liquid containers 2, a medium transporting mechanism 4, a carriage 5, a carriage transporting mechanism 6, a control unit 30, and the multiple liquid ejecting heads 10. The liquid ejecting apparatus 1 includes a circulating mechanism 110. The liquid ejecting apparatus 1 may include the single liquid ejecting head 10 or may include the multiple liquid ejecting heads 10. The liquid ejecting apparatus 1 can execute a recording operation to eject and apply the ink onto the medium PA. The liquid ejecting apparatus 1 can execute a maintenance operation. The maintenance operation includes an operation that is necessary to perform the ink ejection in a normal manner during the recording operation. The maintenance operation includes an operation to discharge air bubbles in the ink. The maintenance operation may include an operation to appropriately maintain the viscosity of the ink and an operation to appropriately maintain the ejecting direction of the ink.

The control unit 30 controls operations of elements in the liquid ejecting apparatus 1. The control unit 30 includes a processing circuit such as a CPU or an FPGA and a memory circuit such as a semiconductor memory, for example. The memory circuit stores various programs and various data. The processing circuit implements various kinds of control by executing the programs and appropriately using the data. The CPU is an abbreviation of a central processing unit. The FPGA is an abbreviation of a field programmable gate array.

The medium transporting mechanism 4 is controlled by the control unit 30 to transport the medium PA in a transporting direction DM. The positional relationship between the transporting direction DM of the medium PA and an ejecting surface F1 of the liquid ejecting head 10 when printing is performed by ejecting the ink from the liquid ejecting head 10 in a printing apparatus is widely known. When printing is performed by ejecting the ink from the liquid ejecting head 10, the ejecting surface F1 of the liquid ejecting head 10 may be parallel to or substantially parallel to the transporting direction DM and the Y-axis direction. The posture of the liquid ejecting head 10 is changed, and the Y-axis direction is also changed along with the posture of the liquid ejecting head 10. The medium transporting mechanism 4 includes a transporting roller that is long along the width direction of the medium PA and a motor rotating the transporting roller. The medium transporting mechanism 4 is not limited to the configuration using the transporting roller and may have a configuration using a drum or an endless belt that transports the medium PA while the medium PA clings onto an outer periphery surface with electrostatic force or the like, for example. The multiple liquid ejecting heads 10 are mounted in the carriage 5.

The liquid container 2 reserves the ink. A specific aspect of the liquid container 2 may include, for example, a cartridge that is attachable and detachable to and from the liquid ejecting apparatus 1, an ink pack in the form of a bag formed of a flexible film, and an ink tank that can be refilled with the ink. The type of the ink reserved in the liquid container 2 is arbitrary.

As illustrated in FIG. 2, the liquid ejecting apparatus 1 includes the circulating mechanism 110. The circulating mechanism 110 includes a sub tank 111, a pump 112, a temperature adjusting unit 113, an ink supply flow channel 114, and an ink discharge flow channel 115. The circulating mechanism 110 collects the ink that is not ejected from a nozzle N of the liquid ejecting head 10 and supplies the ink to the liquid ejecting head 10 again. The sub tank 111 is a tank that temporarily reserves the ink. The sub tank 111 is coupled with the liquid container 2. The sub tank 111 is supplied with the ink from the liquid container 2. In a flow channel through which the ink flows, the terms "upstream" and "downstream" may be used based on the liquid ejecting head 10. Specifically, from the liquid ejecting head 10 to the sub tank 111, a portion in which the ink flows from the sub tank 111 toward the liquid ejecting head 10 in a circulating operation, which is described later, is upstream of the liquid ejecting head 10, and a portion in which the ink flows from the liquid ejecting head 10 toward the sub tank 111 is downstream of the liquid ejecting head 10.

The sub tank 111 is provided with a pressure adjusting unit 111*b*. The pressure adjusting unit 111*b* is a compressor, for example, and can adjust the pressure in the sub tank 111. The pressure adjusting unit 111*b* can make the pressure in the sub tank 111 negative.

The ink supply flow channel 114 is a flow channel to supply the ink in the sub tank 111 to the liquid ejecting head 10. The ink supply flow channel 114 includes, for example, a flow channel member, a pipe, a tube, and the like in which a groove, a recess portion, a through-hole, and the like are formed. The ink supply flow channel 114 includes a flow channel provided upstream of the liquid ejecting head 10.

The pump 112 is a pump provided in the ink supply flow channel 114 to supply the ink in the sub tank 111 to the liquid ejecting head 10. The pump 112 may be a tube pump, for example. The pump 112 may be another pump such as a syringe pump or a diaphragm pump, for example.

The temperature adjusting unit 113 is coupled to the ink supply flow channel 114 and adjusts the temperature of the ink. The temperature adjusting unit 113 is arranged downstream of the pump 112, for example. For example, the temperature adjusting unit 113 includes a tank that temporarily reserves the ink and a heater that heats up the temperature of the ink in the tank. The ink at the temperature adjusted by the temperature adjusting unit 113 is supplied to the liquid ejecting head 10. For example, the heater of the temperature adjusting unit 113 may have a configuration of being controlled by the control unit 30 based on information detected by a temperature sensor 135 described later.

The flow channel of the ink in the liquid ejecting head 10 is described later. The ink discharge flow channel 115 is a flow channel to discharge the ink in the liquid ejecting head 10 to the sub tank 111. The ink discharge flow channel 115 includes, for example, a flow channel member, a pipe, a tube, and the like in which a groove, a recess portion, a through-hole, and the like are formed. The ink discharge flow channel 115 includes a flow channel provided downstream of the liquid ejecting head 10.

Figure 3:
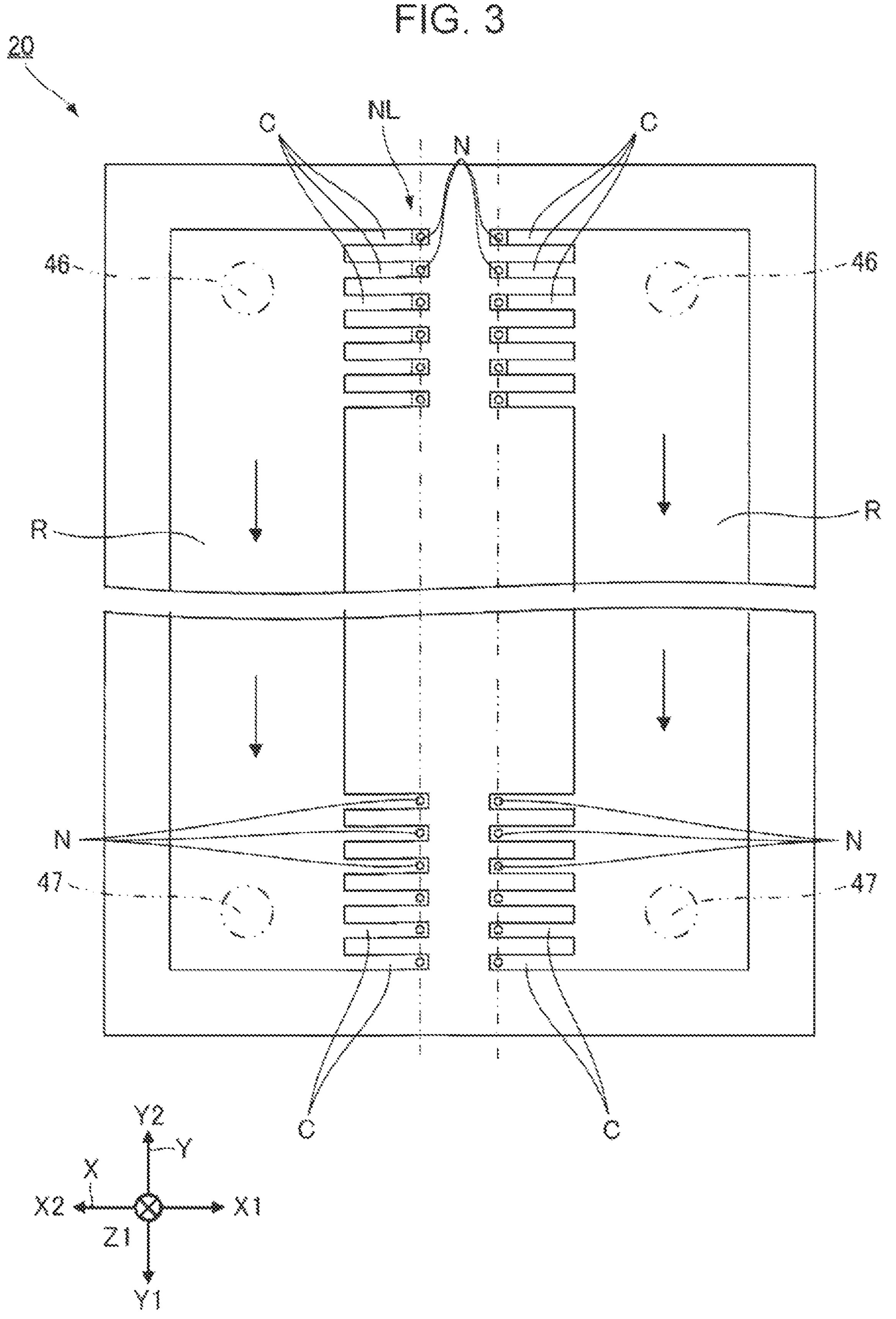
FIG. 3 is a schematic diagram illustrating a common liquid chamber, a pressure chamber, and a nozzle.

A flow of the ink in the liquid ejecting head 10 is described. The liquid ejecting head 10 includes the multiple head chips 20. Each head chip 20 is provided with the multiple nozzles N. The nozzles N are illustrated in FIGS. 3 and 4. The multiple head chips 20 include head chips 20A, 20B, 20C, and 20D. The arrangement of the multiple head chips 20A, 20B, 20C, and 20D is described later. When the multiple head chips 20A, 20B, 20C, and 20D are not distinguished from each other, they may be described as the head chip 20.

The head chip 20A is provided with a common liquid chamber RA. The head chip 20B is provided with a common liquid chamber RB. The head chip 20C is provided with a common liquid chamber RC. The head chip 20D is provided with a common liquid chamber RD. When the common liquid chambers RA to RD are not distinguished from each other, they may be described as a common liquid chamber R.

As illustrated in FIG. 3, the multiple nozzles N communicate with the common liquid chamber R. The common liquid chamber R extends in a longitudinal direction of the head chip 20. The head chip 20 is provided with an ink supply port 46 to supply the common liquid chamber R with the ink and an ink discharge port 47 to discharge the ink from the common liquid chamber R. As illustrated in FIG. 2, the head chip 20A is provided with an ink supply port 46A and an ink discharge port 47A. The head chip 20B is provided with an ink supply port 46B and an ink discharge port 47B. The head chip 20C is provided with an ink supply port 46C and an ink discharge port 47C. The head chip 20D is provided with an ink supply port 46D and an ink discharge port 47D. When the ink supply ports 46A to 46D are not distinguished from each other, they may be described as the ink supply port 46. When the ink discharge ports 47A to 47D are not distinguished from each other, they may be described as the ink discharge port 47.

The liquid ejecting head 10 includes a flow channel 116, flow channels 117A to 117D, flow channels 118A to 118D, and a flow channel 119. The liquid ejecting head 10 includes the temperature sensor 135 that detects information on the temperature of the ink flowing through the flow channel in the liquid ejecting head 10, filters 136A to 136D, and a check valve 137.

The flow channel 116 and the flow channels 117A to 117D are coupled to the ink supply flow channel 114. The flow channel 116 and the flow channels 117A to 117D are flow channels to supply the multiple head chips 20A to 20D with the ink. The flow channels 117A to 117D are flow channels diverging from the flow channel 116.

The flow channel 117A is coupled to the ink supply port 46A of the head chip 20A. The flow channel 117B is coupled to the ink supply port 46B of the head chip 20B. The flow channel 117C is coupled to the ink supply port 46C of the head chip 20C. The flow channel 117D is coupled to the ink supply port 46D of the head chip 20D.

The flow channel 116 and the flow channels 117A to 117D include, for example, a flow channel member, a pipe, a tube, and the like in which a groove, a recess portion, a through-hole, and the like are formed. The ink supplied to the liquid ejecting head 10 flows inside the flow channel 116 and then flows into each of the flow channels 117A to 117D.

The ink in the flow channel 117A is supplied to the common liquid chamber RA of the head chip 20A. The ink in the flow channel 117B is supplied to the common liquid chamber RB of the head chip 20B. The ink in the flow channel 117C is supplied to the common liquid chamber RC of the head chip 20C. The ink in the flow channel 117D is supplied to the common liquid chamber RD of the head chip 20D.

FIG. 3 is a schematic diagram illustrating the common liquid chamber R, pressure chambers C, and the nozzles N. In FIG. 3, the arrangement of the common liquid chamber R, the pressure chambers C, and the nozzles N when viewed in the Z1 direction is illustrated. In FIG. 3, illustration of some of the multiple pressure chambers C and nozzles N is omitted. The head chip 20 includes the common liquid chamber R, the pressure chambers C, and the nozzles N. The head chip 20 includes the multiple pressure chambers C arrayed in the Y-axis direction. The multiple nozzles N communicate with the respective multiple pressure chambers C. The common liquid chamber R communicates with the multiple pressure chambers C. The common liquid chamber R extends in the Y-axis direction.

The ink supply port 46 and the ink discharge port 47 communicate with the common liquid chamber R. The ink supplied to the head chip 20 passes through the ink supply port 46 and flows into the common liquid chamber R. The ink in the common liquid chamber R is supplied to the multiple pressure chambers C. The ink in the pressure chambers C is ejected from the nozzles N. The ink that is not discharged from the nozzles N flows inside the common liquid chamber R and is discharged from the ink discharge port 47. The ink in the common liquid chamber R flows from the ink supply port 46 toward the ink discharge port 47 in the Y-axis direction.

The ink discharged from the common liquid chamber RA of the head chip 20A flows inside the flow channel 118A and flows into the flow channel 119. The ink discharged from the common liquid chamber RB of the head chip 20B flows inside the flow channel 118B and flows into the flow channel 119. The ink discharged from the common liquid chamber RC of the head chip 20C flows inside the flow channel 118C and flows into the flow channel 119. The ink discharged from the common liquid chamber RD of the head chip 20D flows inside the flow channel 118D and flows into the flow channel 119. The flows of the ink in the flow channels 118A to 118D are converged.

The check valve 137 is coupled to the flow channel 119. The check valve 137 prevents a backflow of the ink from the flow channel 119 toward the flow channels 118A to 118D. The ink in the flow channel 119 is discharged to the outside of the liquid ejecting head 10. The ink in the flow channel 119 flows inside the ink discharge flow channel 115 and flows into the sub tank 111. The ink discharged from the liquid ejecting head 10 is collected into the sub tank 111. The ink in the sub tank 111 flows inside the ink supply flow channel 114 and is supplied to the liquid ejecting head 10. The ink is thus circulated.

Figure 5:
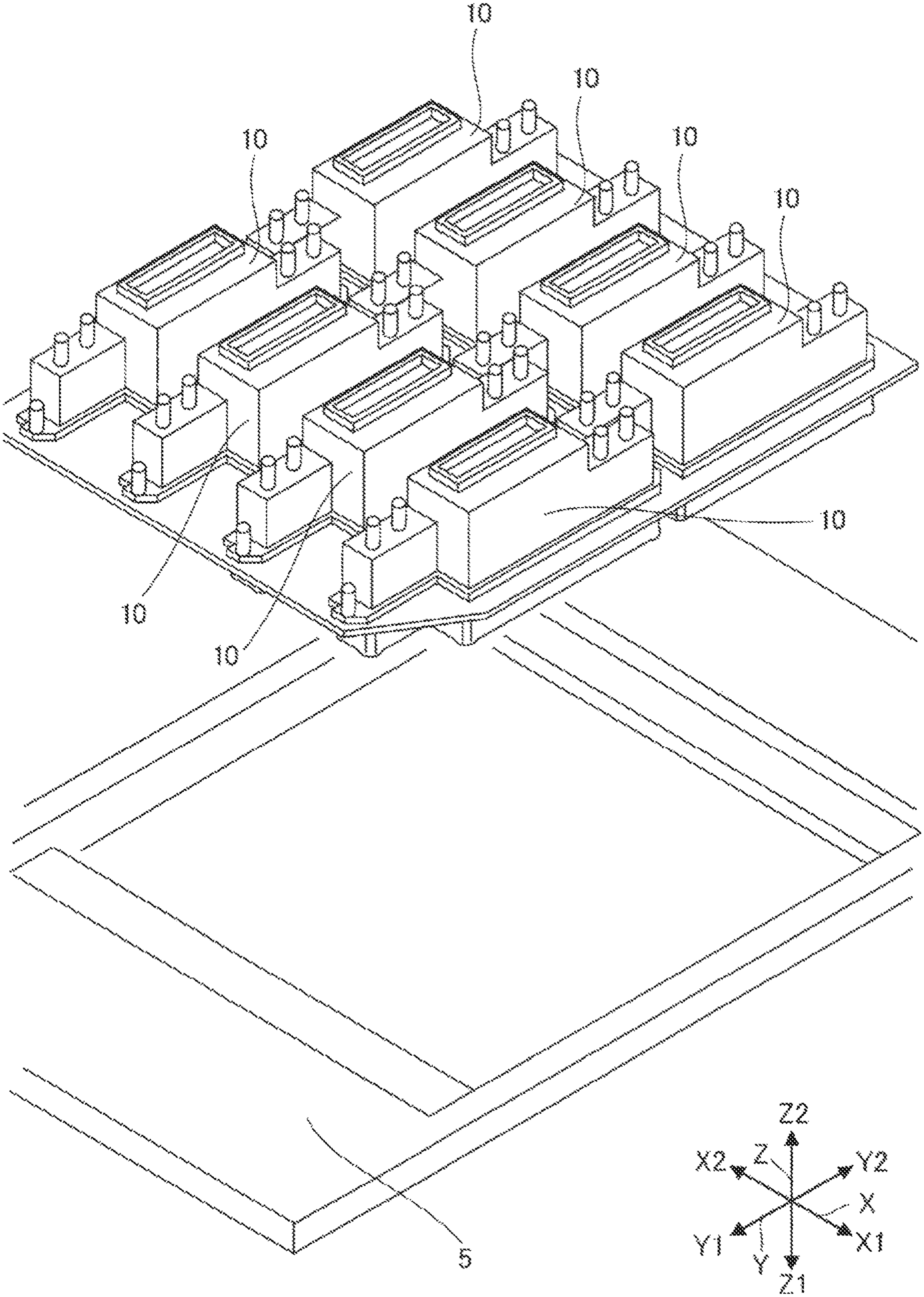
FIG. 5 is a perspective view illustrating multiple liquid ejecting heads.
Figure 6:
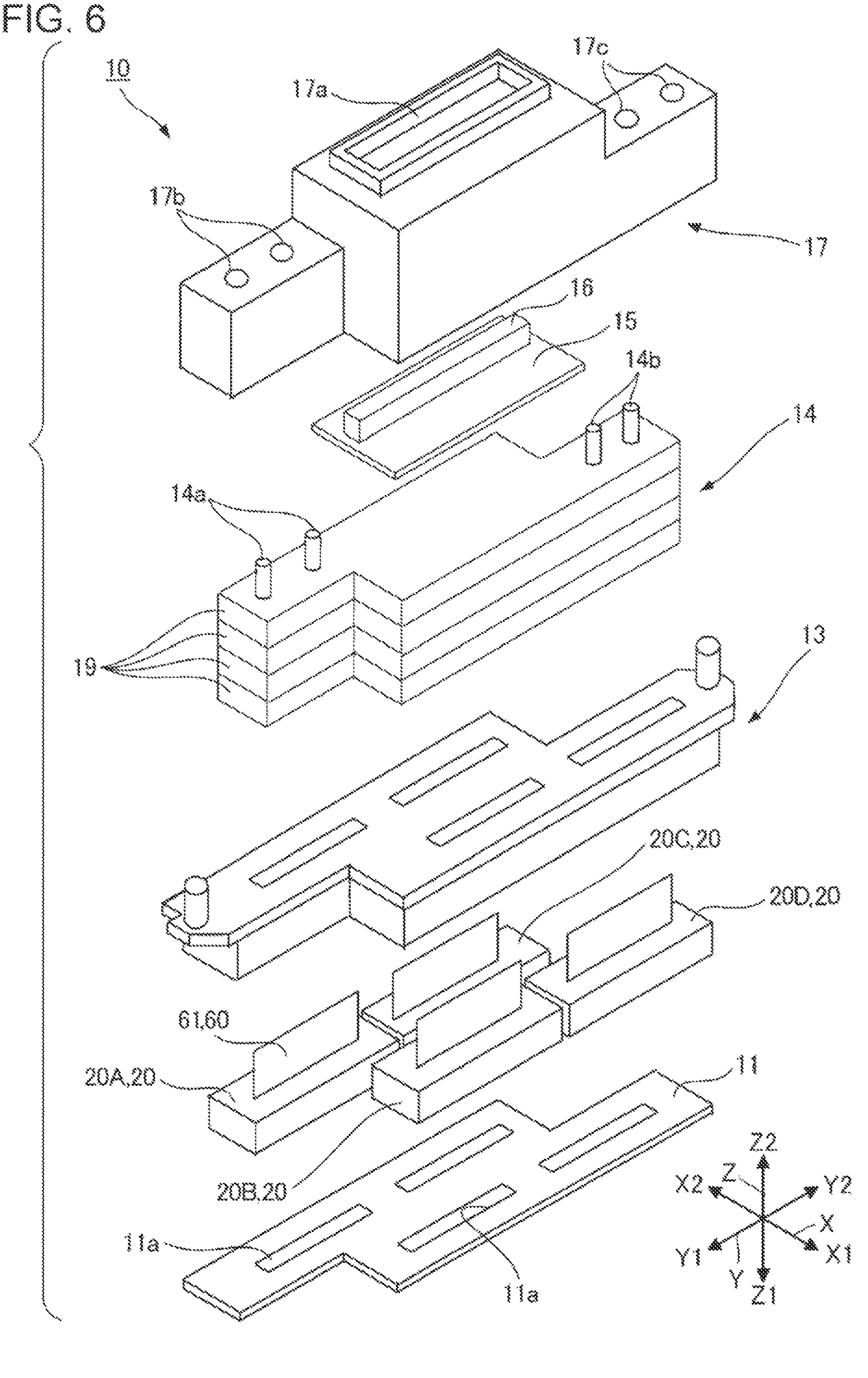
FIG. 6 is an exploded perspective view illustrating the liquid ejecting head.

The liquid ejecting head 10 is described. FIG. 5 is a perspective view illustrating the multiple liquid ejecting heads 10. FIG. 6 is an exploded perspective view illustrating the liquid ejecting head 10. The multiple liquid ejecting heads 10 are mounted in the carriage 5 as described above. As illustrated in FIG. 6, the liquid ejecting head 10 includes a fixing plate 11, the multiple head chips 20 provided with the nozzles N, a holder 13 holding the fixing plate 11 and the head chips 20, a flow channel structure 14 forming the flow channels of the ink, a relay substrate 15 arranged on the top of the flow channel structure 14, a connector 16 provided on the relay substrate 15, and a top cover 17.

The fixing plate 11 forms a bottom surface of the liquid ejecting head 10. In the fixing plate 11, an opening 11*a* to expose the nozzles N of the head chips 20 is formed.

The multiple head chips 20 are arranged at the bottom of the liquid ejecting head 10 and are held by the holder 13. The head chips 20 are each provided with the multiple nozzles N ejecting the liquid. The multiple nozzles N are arrayed in the Y-axis direction to form a nozzle row NL. The size, the number, the positional relationship, and the like of the illustrated nozzles N are not the same as that in reality. As mentioned before, the drawings are schematically illustrated and may be different from the reality.

The flow channel structure 14 is arranged on the holder 13. In the flow channel structure 14, the flow channels through which the ink flows are formed. The flow channel structure 14 includes multiple flow channel substrates 19. The multiple flow channel substrates 19 are layered in a plate thickness direction thereof. In each flow channel substrate 19, a groove and an opening are formed, for example. The flow channels are formed of those groove and opening. The flow channel 116, the flow channels 117A to 117D, the flow channels 118A to 118D, and the flow channel 119 illustrated in FIG. 2 are formed in the flow channel structure 14.

The flow channel structure 14 is provided with an ink supply port 14*a* to introduce the ink to the inside of the flow channel structure 14 and an ink discharge port 14*b* to discharge the ink from the flow channel structure 14. The ink supply port 14*a* and the ink discharge port 14*b* of the present embodiment are provided so as to project in the Z2 direction from the flow channel substrate 19 arranged at the uppermost in the Z-axis direction, that is, in the Z2 direction.

The relay substrate 15 covers the top of the center portion in the Y-axis direction of the flow channel structure 14. The relay substrate 15 is provided with multiple electric wirings. The relay substrate 15 is electrically coupled with a COF 60 of the head chip 20 that is described later in detail through a not-illustrated wiring member.

The connector 16 protrudes upward from the relay substrate 15. The connector 16 is electrically coupled with an electric part outside the liquid ejecting head 10. The head chip 20 is electrically coupled with the control unit 30 through the connector 16.

An end portion of the top cover 17 in the Z1 direction is in contact with a surface of the holder 13 in the Z2 direction, and the top cover 17 stores the flow channel structure 14, the relay substrate 15, and the connector 16 between the end portion of the top cover 17 and the surface of the holder 13 in the Z2 direction. An upper surface of the top cover 17 on a side of the Z2 direction is provided with a wiring opening 17*a* to insert an external wiring member into the connector 16 and openings 17*b* and 17*c* to couple the ink supply port 14*a* and the ink discharge port 14*b* with a flow channel member outside the liquid ejecting head 10 such as a tube. The ink supply flow channel 114 and the ink discharge flow channel 115 are formed inside this flow channel member outside the liquid ejecting head 10.

In FIG. 4, an outline of the liquid ejecting head 10 is illustrated with a dashed-two dotted line. The outline of the liquid ejecting head 10 in a plan view when viewed in the Z1 direction as the ejecting direction includes a center portion 81 and projecting portions 82 and 83. The projecting portion 82 protrudes in the Y2 direction from the center portion 81 when viewed in the Z-axis direction. The projecting portion 83 protrudes in the Y1 direction from the center portion 81 when viewed in the Z-axis direction.

In the multiple liquid ejecting heads 10 arrayed in the Y-axis direction, the projecting portion 82 of the liquid ejecting head 10 positioned in the Y1 direction and the projecting portion 83 of the liquid ejecting head 10 positioned in the Y2 direction are arranged to be overlapped with each other when viewed in the X-axis direction.

The arrangement of the head chips 20A to 20D is described with reference to FIG. 4. The head chips 20A and 20C are arrayed adjacent to each other in the Y-axis direction. The head chips 20B and 20D are arrayed adjacent to each other in the Y-axis direction. The head chips 20A and 20C are arranged to be overlapped with each other when viewed in the Y-axis direction. The head chips 20B and 20D are arranged to be overlapped with each other when viewed in the Y-axis direction. The head chips 20A and 20C and the head chips 20B and 20D are not overlapped with each other when viewed in the Y-axis direction. The head chips 20B and 20D are positioned in the X1 direction from the head chips 20A and 20C.

An end portion of the head chip 20A in the Y2 direction and an end portion of the head chip 20B in the Y1 direction are arranged to be overlapped with each other when viewed in the X-axis direction. A part of the nozzle row NL of the head chip 20A and a part of the nozzle row NL of the head chip 20B are overlapped with each other when viewed in the X-axis direction. An end portion of the head chip 20B in the Y2 direction and an end portion of the head chip 20C in the Y1 direction are arranged to be overlapped with each other when viewed in the X-axis direction. A part of the nozzle row NL of the head chip 20B and a part of the nozzle row NL of the head chip 20C are overlapped with each other when viewed in the X-axis direction. An end portion of the head chip 20C in the Y2 direction and an end portion of the head chip 20D in the Y1 direction are arranged to be overlapped with each other when viewed in the X-axis direction. A part of the nozzle row NL of the head chip 20C and a part of the nozzle row NL of the head chip 20D are overlapped with each other when viewed in the X-axis direction. An end portion of the head chip 20D in the Y2 direction of one liquid ejecting head 10 and an end portion of the head chip 20A in the Y1 direction of the other liquid ejecting head 10 are arranged to be overlapped with each other when viewed in the X-axis direction. A part of the nozzle row NL of the head chip 20D of the one liquid ejecting head 10 and a part of the nozzle row NL of the head chip 20A of the other liquid ejecting head 10 are overlapped with each other when viewed in the X-axis direction.

In the head chip 20A, the ink supply port 46A is arranged in the end portion in the Y2 direction, and the ink discharge port 47A is arranged in the end portion in the Y1 direction. In the head chip 20B, the ink discharge port 47B is arranged in the end portion in the Y2 direction, and the ink supply port 46B is arranged in the end portion in the Y1 direction. In the head chip 20C, the ink supply port 46C is arranged in the end portion in the Y2 direction, and the ink discharge port 47C is arranged in the end portion in the Y1 direction. In the head chip 20D, the ink discharge port 47D is arranged in the end portion in the Y2 direction, and the ink supply port 46D is arranged in the end portion in the Y1 direction.

In the head chips 20A and 20B adjacent to each other in the X-axis direction, the ink supply ports 46A and 46B are arranged in positions close to each other. In the Y-axis direction, the ink supply ports 46A and 46B are arranged in positions close to each other. The ink supply port 46A is arranged in a position closer to the ink supply port 46B than to the ink discharge port 47B.

In the head chips 20B and 20C adjacent to each other in the X-axis direction, the ink discharge ports 47B and 47C are arranged in positions close to each other. In the Y-axis direction, the ink discharge ports 47B and 47C are arranged in close positions. The ink discharge port 47B is arranged in a position closer to the ink discharge port 47C than to the ink supply port 46C.

In the head chips 20C and 20D adjacent to each other in the X-axis direction, the ink supply ports 46C and 46D are arranged in positions close to each other. In the Y-axis direction, the ink supply ports 46C and 46D are arranged in close positions. The ink supply port 46C is arranged in a position closer to the ink supply port 46D than to the ink discharge port 47D.

The head chips 20B and 20C are arranged to be overlapped with the center portion 81 when viewed in the Z-axis direction. The end portion of the head chip 20A in the Y2 direction is arranged to be overlapped with the center portion 81 in the Z-axis direction. The end portion of the head chip 20A in the Y1 direction is arranged to be overlapped with the projecting portion 83 when viewed in the Z-axis direction. The end portion of the head chip 20D in the Y1 direction is arranged to be overlapped with the center portion 81 when viewed in the Z-axis direction. The end portion of the head chip 20D in the Y2 direction is arranged to be overlapped with the projecting portion 82 when viewed in the Z-axis direction.

Figure 7:
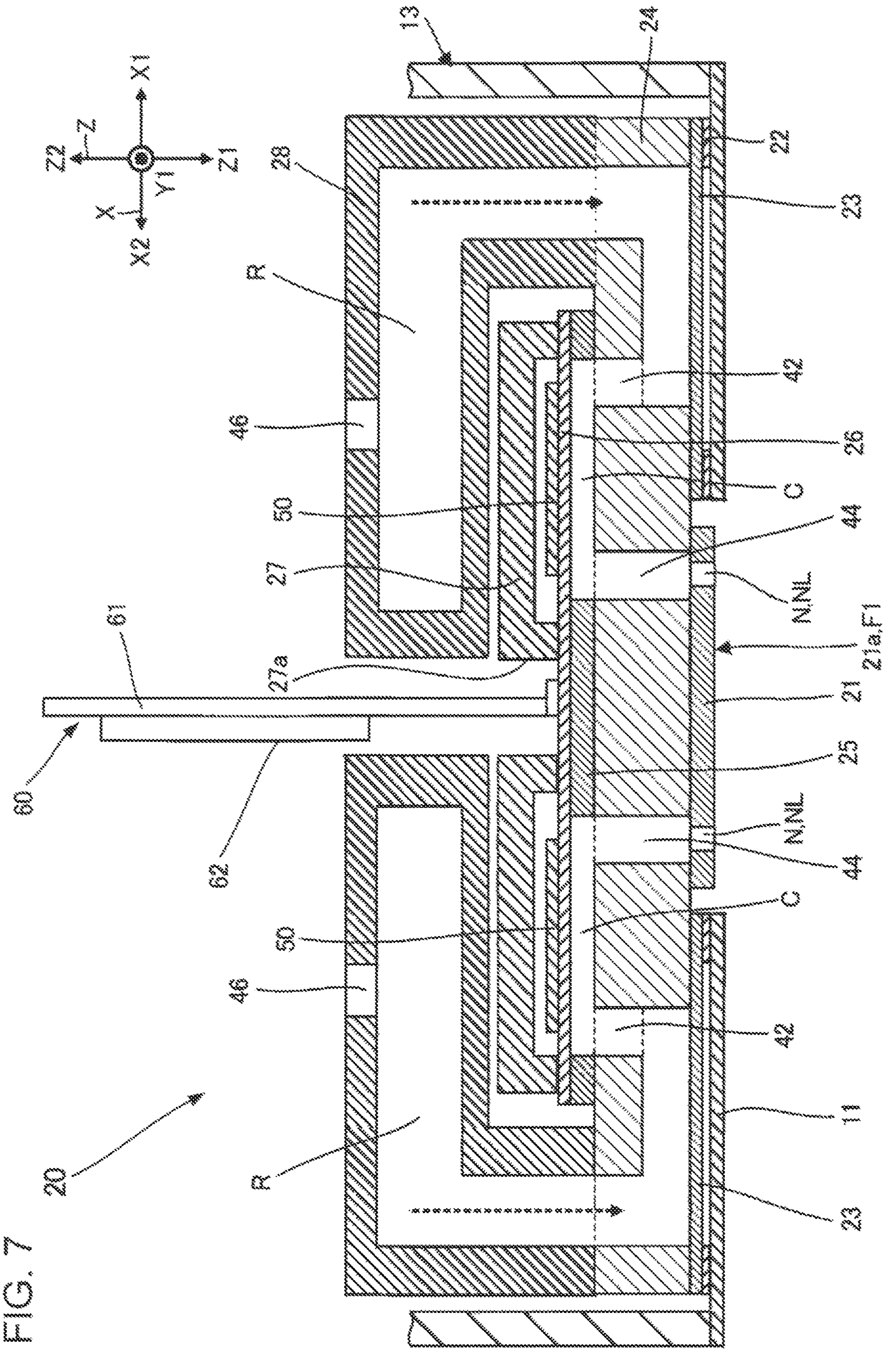
FIG. 7 is a cross-sectional view illustrating the head chip.

A structure inside the head chip 20 is described with reference to FIG. 7. FIG. 7 is a cross-sectional view illustrating a cross-section along an XZ-plane of the head chip 20. The XZ-plane is a plane along the X-axis direction and the Z-axis direction. The head chip 20 includes the common liquid chamber R, a relay flow channel 42, the pressure chamber C, a communication flow channel 44, a piezoelectric element 50, and the nozzle N. The head chip 20 includes a nozzle plate 21, a compliance substrate 23, a communication plate 24, a pressure chamber forming plate 25, a vibration plate 26, a sealing plate 27, and a case 28.

The thickness direction of the nozzle plate 21, the compliance substrate 23, the communication plate 24, the pressure chamber forming plate 25, the vibration plate 26, the sealing plate 27, and the case 28 is along the Z-axis direction. The nozzle plate 21, the communication plate 24, the pressure chamber forming plate 25, the vibration plate 26, and the sealing plate 27 are layered in this order in the Z-axis direction. The compliance substrate 23 is positioned on an outer side of the nozzle plate 21 in the X-axis direction. The compliance substrate 23 is positioned in the Z1 direction from the communication plate 24.

The nozzle plate 21 extends in the Y-axis direction and has a predetermined length. In the nozzle plate 21, the multiple nozzles N are formed. The nozzles N are holes penetrating the nozzle plate 21 in the plate thickness direction thereof. The multiple nozzles N form the nozzle row NL arrayed in the Y-axis direction. The multiple nozzle rows NL are away from each other in the X-axis direction.

In the communication plate 24, a part of the common liquid chamber R, the relay flow channel 42, and the communication flow channel 44 are formed. A portion of the common liquid chamber R in the Z1 direction is formed in the communication plate 24. The communication flow channel 44 communicates with each nozzle N. The multiple communication flow channels 44 communicate with the respective multiple nozzles N. The nozzle plate 21 is arranged in the Z1 direction from the communication plate 24. The nozzles N are arranged in the Z1 direction from the corresponding communication flow channels 44. The communication plate 24 is formed of silicon or metal such as stainless steel, for example.

The compliance substrate 23 is formed to cover an opening portion formed in the communication plate 24. A space of the opening portion formed in the communication plate 24 is included in the common liquid chamber R. The compliance substrate 23 is supported by the fixing plate 11 with a support plate 22 arranged therebetween. The support plate 22 is formed to surround the common liquid chamber R and the relay flow channel 42 when viewed in the Z-axis direction. The support plate 22 is formed of metal such as stainless steel, for example. In the Z-axis direction, a clearance is formed between the common liquid chamber R and the fixing plate 11. The compliance substrate 23 is formed of a flexible member such as a resin film and a metallic thin plate and is modified in the Z1 direction and the Z2 direction to be close to and away from the fixing plate 11 to reduce a pressure variation of the ink in the common liquid chamber R.

The pressure chamber forming plate 25 is positioned in the Z2 direction from the communication plate 24. In the pressure chamber forming plate 25, the multiple pressure chambers C are formed. The multiple pressure chambers C are formed for the respective multiple nozzles N. The pressure chambers C each communicate with the relay flow channel 42 and the communication flow channel 44.

The vibration plate 26 is arranged in the Z2 direction from the pressure chamber forming plate 25. The vibration plate 26 forms wall surfaces of the pressure chambers C in the Z2 direction. On a surface of the vibration plate 26 in the Z2 direction, the multiple piezoelectric elements 50 are arranged. The multiple piezoelectric elements 50 are provided for the respective multiple pressure chambers C. Each piezoelectric element 50 includes multiple electrodes and a piezoelectric body layer arranged between the electrodes.

In the Z2 direction from the vibration plate 26, the sealing plate 27 is arranged. The sealing plate 27 covers the multiple piezoelectric elements 50. The sealing plate 27 reinforces the vibration plate 26 and also protects the multiple piezoelectric elements 50.

In the case 28, a part of the common liquid chamber R is formed. In the common liquid chamber R, a portion in the Z2 direction is formed in the case 28, and a portion in the Z1 direction is formed in the communication plate 24. In the case 28, the ink supply port 46 and the ink discharge port 47 are formed. As described above, the common liquid chamber R extends in the Y-axis direction and communicates with the multiple pressure chambers C commonly. As illustrated in FIG. 4, the ink supply port 46 and the ink discharge port 47 are away from each other in the Y-axis direction.

As illustrated in FIG. 7, the ink passes through the ink supply port 46 and flows into the common liquid chamber R. The ink in the common liquid chamber R passes through the relay flow channel 42 and flows into the pressure chamber C. The ink in the pressure chamber C passes through the communication flow channel 44 and is ejected from the nozzle N.

The head chip 20 includes the COF 60. The COF is an abbreviation of a chip on film. The COF 60 includes a flexible wiring substrate 61 and a driving circuit 62. The flexible wiring substrate 61 is a wiring substrate with flexibility. The flexible wiring substrate 61 is an FPC, for example. The flexible wiring substrate 61 may be an FFC, for example. The FPC is an abbreviation of a flexible printed circuit. The FFC is a flexible flat cable.

The piezoelectric elements 50 are electrically coupled with the flexible wiring substrate 61 through a not-illustrated lead electrode. The driving circuit 62 is electrically coupled with the flexible wiring substrate 61. The flexible wiring substrate 61 is electrically coupled with the control unit 30 illustrated in FIG. 1.

The piezoelectric elements 50 are electrically coupled with the control unit 30. The piezoelectric elements 50 are driven under control of the control unit 30. The piezoelectric elements 50 each deform the vibration plate 26 forming the wall surfaces of the pressure chambers C to change the inner volume in the corresponding pressure chamber C. With this, the piezoelectric element 50 ejects the ink in the pressure chamber C from the nozzle N. The liquid ejecting head 10 may have a configuration including another driving element such as a heating element instead of the piezoelectric element 50.

Each head chip 20 of the present embodiment includes the two nozzle rows NL. The two nozzle rows NL provided in the head chip 20 may eject the same type of liquid or may eject different types of ink. Multiple common liquid chambers RA to RD communicating with one of the two nozzle rows NL included in each of the multiple head chips 20 and multiple common liquid chambers RA to RD communicating with the other one of the two nozzle rows NL included in each of the multiple head chips 20 may be flow channels independent from each other. That is, the liquid ejecting apparatus 1 may include two groups of flow channels each including the flow channel 116, the flow channels 117A to 117D, the flow channels 118A to 118D, the flow channel 119, the liquid container 2, and the circulating mechanism 110, the two groups of flow channels corresponding to the respective two nozzle rows NL. The number of the nozzle rows NL provided in the head chip 20 and the number of the groups of flow channels in the liquid ejecting apparatus 1 are arbitrary.

Figure 8:
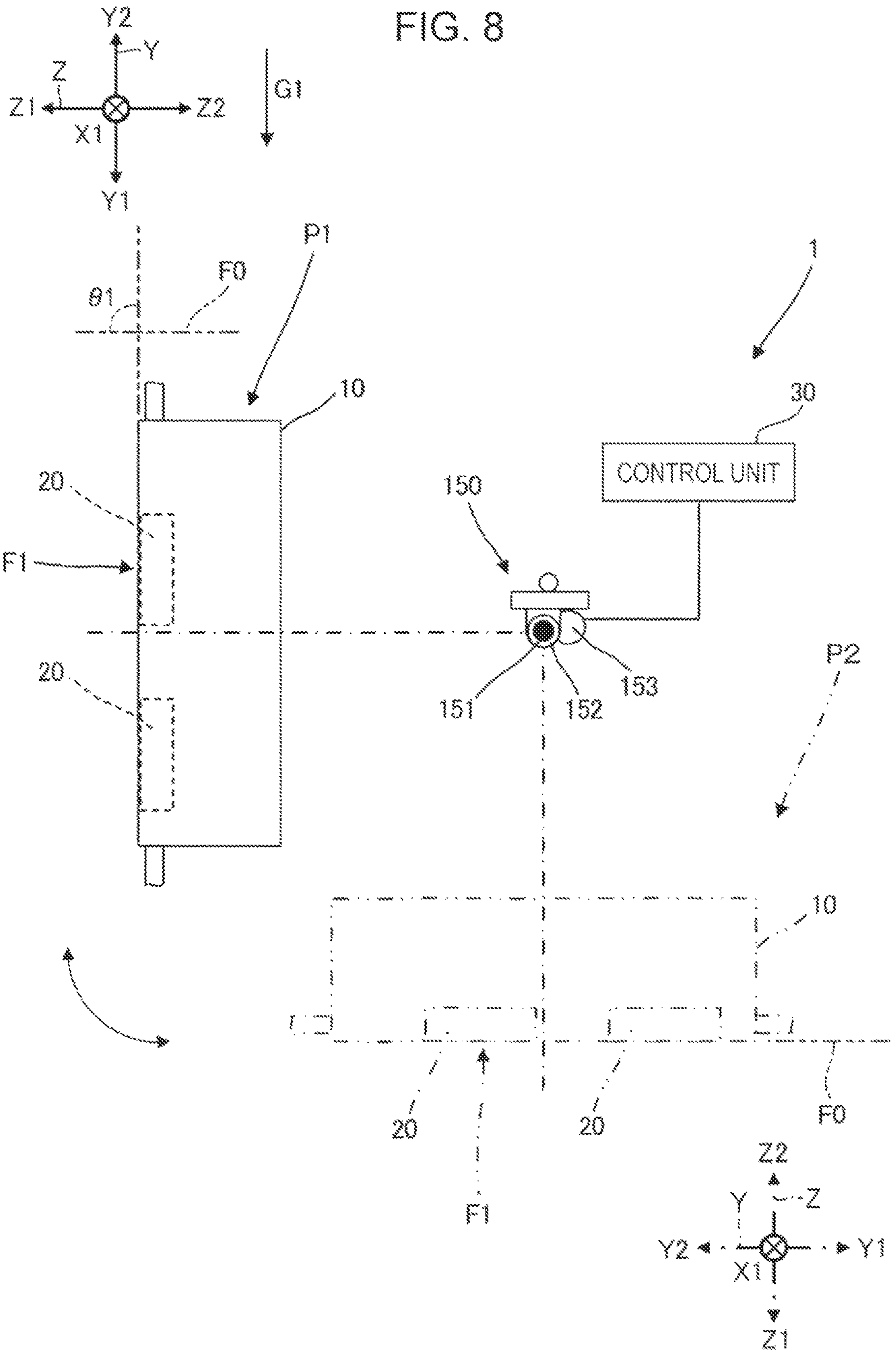
FIG. 8 is a schematic diagram illustrating a first posture and a second posture of the liquid ejecting head.

A posture change in the liquid ejecting head 10 is described with reference to FIG. 8. FIG. 8 is a schematic diagram illustrating the liquid ejecting head 10. In FIG. 8, the liquid ejecting head 10 in a first posture P1 in which the ejecting surface F1 inclines with respect to a horizontal plane F0 is illustrated with a solid line, and the liquid ejecting head 10 in a second posture P2 in which the ejecting surface F1 is arranged along the horizontal plane F0 is illustrated with a dashed-two dotted line. A case in which the ejecting surface F1 inclines with respect to the horizontal plane F0 includes a case in which the ejecting surface F1 crosses the horizontal plane F0 and also includes a case in which the ejecting surface F1 is orthogonal to the horizontal plane F0. The liquid ejecting head 10 can rotate and move about a rotation shaft 151 extending in the X-axis direction. The ejecting surface F1 is a surface 21*a* within the nozzle plate 21 in which an opening of the nozzle N is formed as illustrated in FIG. 7. The surface 21*a* is a surface of the nozzle plate 21 on a side of the Z1 direction, which is the ejecting direction in which the nozzle N ejects the ink. In other words, a surface of the nozzle plate 21 on the opposite side from the pressure chamber C in the Z-axis direction is the surface 21*a*.

As illustrated in FIG. 8, the posture of the liquid ejecting head 10 is changeable to multiple postures including the first posture P1 and the second posture P2. The liquid ejecting apparatus 1 includes a posture change mechanism 150 that changes the posture of the liquid ejecting head 10. The posture change mechanism 150 includes a bearing 152 that holds the rotation shaft 151 extending in the X-axis direction and a driving mechanism 153 that rotates the rotation shaft 151. The bearing 152 rotatably supports the rotation shaft 151. The driving mechanism 153 includes a motor, for example. The rotation shaft 151 is coupled with the carriage 5 holding the liquid ejecting head 10.

In the first posture P1 and the second posture P2, the rotation shaft 151 may be in the same position or may be in different positions. The posture change in the liquid ejecting head 10 from the first posture P1 to the second posture P2 may include a linear movement of the liquid ejecting head 10. The liquid ejecting apparatus 1 can linearly move the bearing 152 holding the rotation shaft 151. For example, the rotation shaft 151 and the bearing 152 can be moved linearly with a rack and pinion. The liquid ejecting head 10 can be linearly moved by using another ball screw, a guide groove, an actuator, a belt mechanism, or the like.

The liquid ejecting apparatus 1 executes the recording operation by the liquid ejecting head 10 in the first posture P1 and executes the circulating operation in the second posture P2. The "recording operation" is to eject the ink from the nozzle N to apply the ink to the medium and record a letter, an image, and the like. A printing operation is an example of the recording operation. The liquid ejecting apparatus 1 can collect and circulate the ink that is not ejected from the nozzle N during the execution of the recording operation.

In the first posture P1 of the liquid ejecting head 10, the ejecting surface F1 crosses the horizontal plane F0. In the present embodiment, in the first posture P1, the ejecting surface F1 and the horizontal plane F0 cross each other substantially perpendicularly. To be more specific, in the present embodiment, an angle θ1 made by the ejecting surface F1 and the horizontal plane F0 in the first posture P1 is 90 degrees. "Substantially perpendicularly" includes orthogonally. A case in which the angle θ1 made by the ejecting surface F1 and the horizontal plane F0 in the first posture P1 is equal to or more than 80 degrees and equal to or less than 100 degrees may be the case in which the ejecting surface F1 and the horizontal plane F0 cross each other "substantially perpendicularly". The angle θ1 in the first posture P1 may be an angle smaller than 80 degrees and may be 30 degrees, 45 degrees, or 60 degrees, for example. In the liquid ejecting head 10 in such a first posture P1, the ink is ejected from the nozzle N and the recording operation is executed.

An angle θ2 made by the ejecting surface F1 and the horizontal plane F0 in the second posture P2 of the liquid ejecting head 10 is smaller than the angle θ1. In the present embodiment, in the second posture P2, the ejecting surface F1 is substantially parallel to the horizontal plane F0. To be more specific, in the present embodiment, in the second posture P2, the ejecting surface F1 is parallel to the horizontal plane F0. "Substantially parallel" includes parallel. A case in which the angle θ2 in the second posture P2 is equal to or more than −10 degrees and equal to or less than +10 degrees may be the case in which the ejecting surface F1 and the horizontal plane F0 are "substantially parallel" to each other. The angle θ2 is, for example, a rotation angle about the X-axis, and a clockwise rotation is positive while a counterclockwise rotation is negative. In the angle θ2, a clockwise rotation may be positive while a counterclockwise rotation may be negative. In FIG. 8, since the ejecting surface F1 is arranged along the horizontal plane F0 in the second posture P2, the angle θ2 is not illustrated. The angle θ2 is not limited to 0 degrees and may be a value greater than 0 degrees. The angles θ1 and θ2 may be an angle that is the smaller one of the angles made by the horizontal plane F0 and the ejecting surface F1. A difference between the angle θ1 and the angle θ2 may be equal to or more than 5 degrees or equal to or less than 90 degrees, for example.

The circulating operation performed in the second posture P2 includes a filling operation to fill the liquid ejecting head 10 with the ink, for example. The filling operation to fill the liquid ejecting head 10 with the ink includes an operation to fill the multiple head chips 20 and the flow channels 116, 117A to 117D, 118A to 118D, and 119 with the ink. This filling operation is performed before the first use of the liquid ejecting head 10, for example. For example, the filling operation is also performed after replacement of the liquid ejecting head 10. The filling operation is performed before using the liquid ejecting head 10 after a periodic inspection of the liquid ejecting head 10. The filling operation is performed after maintenance such as ink replacement and cleaning of the inside of the flow channel. The filling operation may include refilling of the ink. Such a filling operation may be referred to as "initial filling".

The circulating operation performed in the second posture P2 includes a cleaning operation of the liquid ejecting head 10. In the cleaning operation, the ink is circulated. In the cleaning operation, another cleaning liquid may be circulated. The cleaning operation is periodically performed, for example. The cleaning operation may be executed when the time of the recording operation exceeds a certain period of time, for example. The cleaning operation may be executed after the liquid ejecting apparatus 1 is powered on. The cleaning operation may be executed before or after the recording operation. The cleaning operation may be executed when occurrence of abnormality in the liquid ejecting head 10 is detected.

The circulating operation is not limited to the filling operation and the cleaning operation. The circulating operation may include another operation to circulate the ink in a state where the recording operation is not executed. Another maintenance operation may be executed during the circulating operation.

In the circulating operation, as described above, the ink in the sub tank 111 flows inside the ink supply flow channel 114 and is supplied to the liquid ejecting head 10. The ink discharged from the liquid ejecting head 10 flows inside the ink discharge flow channel 115 and is collected into the sub tank 111.

In the circulating operation, the ink introduced in the liquid ejecting head 10 flows inside the flow channel 116 and the flow channels 117A to 117D and is supplied to the head chips 20A to 20D. The ink discharged from the head chips 20A to 20D flow inside the flow channels 118A to 118D and the flow channel 119 and is discharged into the ink discharge flow channel 115.

In the circulating operation, the ink introduced in the head chips 20A to 20D passes through the ink supply port 46 and is supplied into the common liquid chamber R. The ink supplied in the common liquid chamber R flows inside the common liquid chamber R in the Y-axis direction. The ink flowing inside the common liquid chamber R passes through the ink discharge port 47 and is discharged from the head chips 20A to 20D. The ink discharged from the head chips 20A to 20D flows into the flow channels 118A to 118D. The ink flowing through the common liquid chamber R of the head chips 20A to 20D is collected into the sub tank 111 as described above. The ink is thus circulated.

The control unit 30 controls the circulating mechanism 110. The control unit 30 executes the circulating operation by controlling the pump 112. The control unit 30 can execute the posture change in the liquid ejecting head 10 by controlling the posture change mechanism 150. The control unit 30 can change the liquid ejecting head 10 into the first posture P1 or the second posture P2 by controlling the driving mechanism 153.

Figure 9:
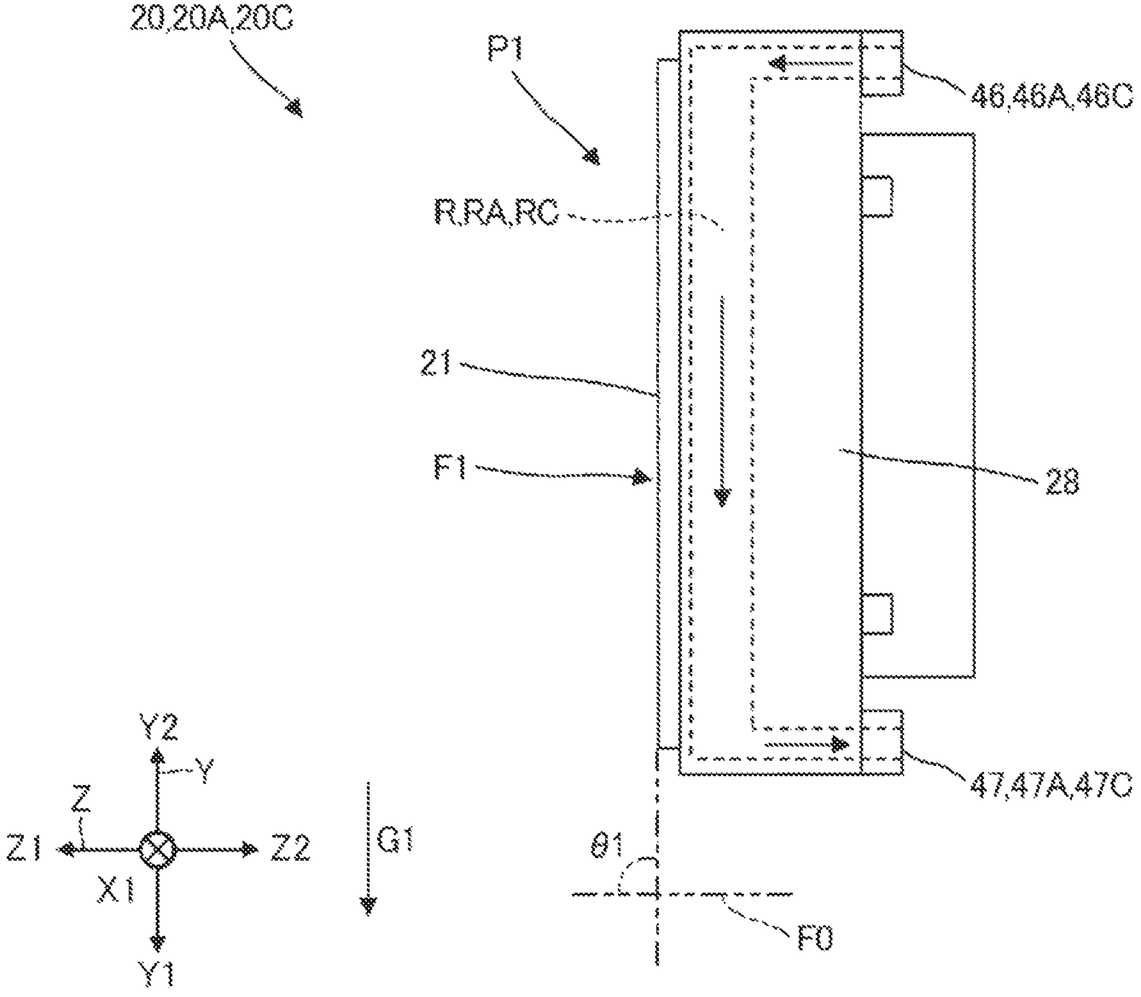
FIG. 9 is a side view illustrating the head chip in the first posture.

FIG. 9 is a side view illustrating the head chip 20 in the first posture P1. In the head chip 20A and the head chip 20C in the first posture P1, the positions of the ink discharge ports 47 with respect to the ink supply ports 46 are the same; for this reason, either of the head chips 20A and 20C in the first posture P1 is illustrated in FIG. 9 for the sake of convenience. In the head chip 20A in the first posture P1, the ink discharge port 47A is positioned below the ink supply port 46A in the gravity direction G1. In the head chip 20C in the first posture P1, the ink discharge port 47C is positioned below the ink supply port 46C in the gravity direction G1. In the head chips 20A and 20C in the first posture P1, the ink flowing in the common liquid chambers RA and RC flows downward in the gravity direction G1. In the present embodiment, the ink in the common liquid chamber R flows along the Y-axis, and the Y-axis in the first posture P1 is parallel to the gravity direction G1; accordingly, the ink flowing in the common liquid chambers RA and RC flows in the gravity direction G1. The gravity direction G1 is an example of a "first flow direction". The Y1 direction in the first posture P1 that is the same direction as the gravity direction G1 is also an example of the "first flow direction". In this case, "downward in the gravity direction G1" indicates facing downward with respect to the horizontal plane F0 while the gravity direction G1 is a downward direction and the opposite direction to the gravity direction G1 is an upward direction, and it is not limited to only the gravity direction G1. Likewise, "upward in the gravity direction G1" indicates facing upward with respect to the horizontal plane F0, and it is not limited to only the opposite direction to the gravity direction G1.

Although it is not illustrated in FIG. 9, the head chips 20B and 20D in the first posture P1 are flipped vertically with respect to the head chips 20A and 20C. In the head chip 20B in the first posture P1, the ink supply port 46B is positioned below the ink discharge port 47B in the gravity direction G1. In the head chip 20D in the first posture P1, the ink supply port 46D is positioned below the ink discharge port 47D in the gravity direction G1. In the head chips 20B and 20D in the first posture P1, the ink flowing in the common liquid chambers RB and RD flows upward in the gravity direction G1. In the present embodiment, the ink in the common liquid chamber R flows along the Y-axis, and the Y-axis in the first posture P1 is parallel to the gravity direction G1; accordingly, the ink flowing in the common liquid chambers RB and RD flows in the opposite direction to the gravity direction G1. The Y2 direction in the first posture P1 that is the opposite direction to the gravity direction G1 is an example of a "second flow direction".

Figure 10:
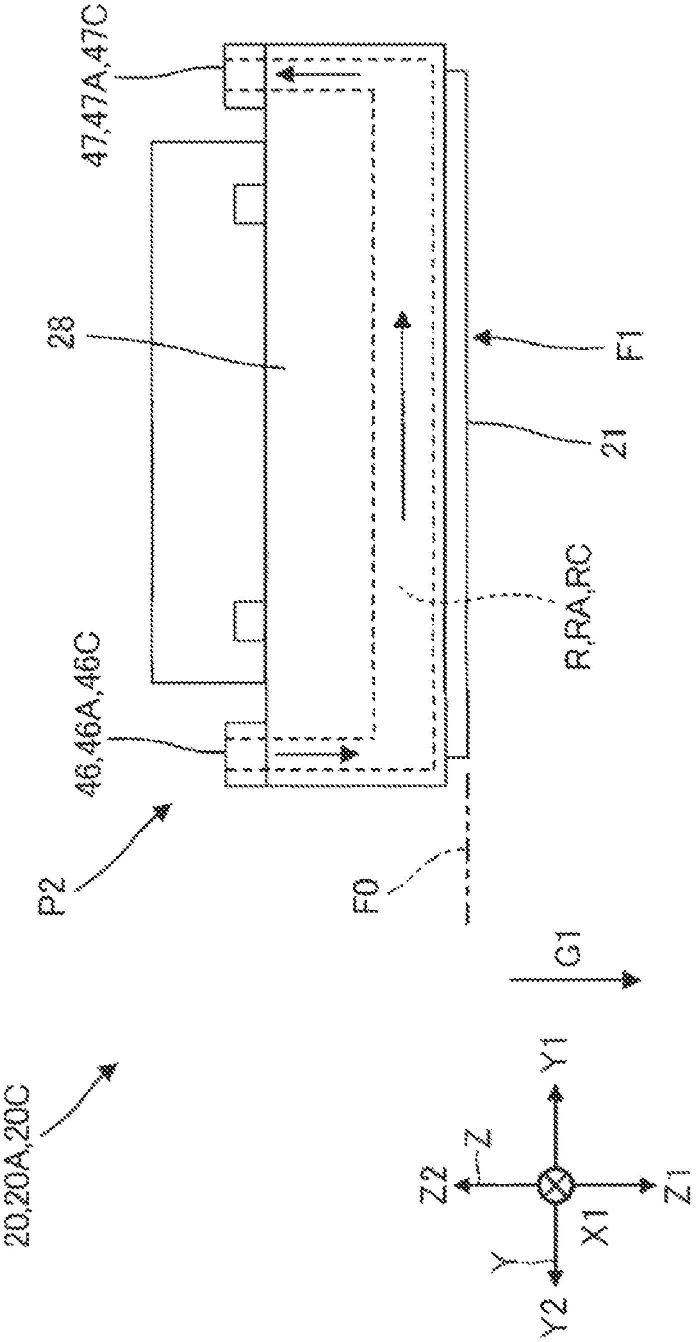
FIG. 10 is a side view illustrating the head chip in the second posture.

FIG. 10 is a side view illustrating the head chip 20 in the second posture P2. In the head chip 20A and the head chip 20C in the second posture P2, the positions of the ink discharge ports 47 with respect to the ink supply ports 46 are the same; for this reason, either of the head chips 20A and 20C in the second posture P2 is illustrated in FIG. 10 for the sake of convenience. In the head chips 20A and 20C in the second posture P2, the ink supply ports 46A and 46C and the ink discharge ports 47A and 47C are arranged in the same positions in the gravity direction G1. In the head chips 20A and 20C in the second posture P2, the ink flowing in the common liquid chambers RA and RC flows in the Y1 direction in the second posture P2 along the horizontal plane F0.

Although it is not illustrated in FIG. 10, the head chips 20B and 20D in the second posture P2 are flipped horizontally with respect to the head chips 20A and 20C. For example, when viewed in the X1 direction, the Y1 direction is right, and the Y2 direction is left. In the head chips 20B and 20D in the second posture P2, the ink supply ports 46B and 46D and the ink discharge ports 47B and 47D are arranged in the same positions in the gravity direction G1. In the head chips 20B and 20D in the second posture P2, the ink flowing in the common liquid chambers RB and RD flows in the Y2 direction in the second posture P2 along the horizontal plane F0.

Such a liquid ejecting apparatus 1 includes the liquid ejecting head 10 including the ejecting surface F1 to eject the ink, the sub tank 111 that reserves the ink to be supplied to the liquid ejecting head 10, the circulating mechanism 110 that executes the circulating operation to circulate the ink between the liquid ejecting head 10 and the sub tank 111, and the control unit 30 that controls the circulating mechanism 110. The control unit 30 executes the recording operation by the liquid ejecting head 10 in the first posture P1 in which the ejecting surface F1 crosses the horizontal plane F0 and executes the circulating operation in the second posture P2 in which the angle made by the ejecting surface F1 and the horizontal plane F0 is smaller than that in the first posture P1.

The liquid ejecting apparatus 1 in the present embodiment executes the circulating operation in the second posture P2; for this reason, the flow direction of the ink in the common liquid chamber R is a direction at a smaller angle with respect to the horizontal plane F0 than that of the first posture P1. With this, the air bubbles are more likely to be discharged from the common liquid chamber R than a case of executing the circulating operation in the first posture P1. Thus, a risk that the air bubbles remain in the common liquid chamber R after the circulating operation is reduced, and a risk of causing an ejection failure because the air bubbles in the common liquid chamber R are drawn into the nozzle N and the pressure chamber C during the subsequent recording operation is suppressed. As a result, the reliability of the recording operation in the liquid ejecting head 10 is improved.

For example, in the head chips 20A and 20C in the first posture P1 illustrated in FIG. 9, the Y1 direction in which the ink flows in the common liquid chambers RA and RC is the gravity direction G1. The buoyancy acting on the air bubbles in the common liquid chambers RA and RC is in the opposite direction to the gravity direction G1. Therefore, the air bubbles in the common liquid chambers RA and RC are less likely to be discharged from the ink discharge ports 47A and 47C if the ink circulating operation is executed on such head chips 20A and 20C in the first posture P1. On the other hand, in the liquid ejecting apparatus 1, the circulating operation is executed in the second posture P2 as illustrated in FIG. 10; for this reason, the buoyancy of the air bubbles acting in the opposite direction to the Y1 direction in which the ink flows in the common liquid chambers RA and RC of the head chips 20A and 20C is smaller than that of the first posture P1, and thus the air bubbles in the common liquid chamber R are likely to be discharged from the ink discharge port 47.

The circulating operation performed in the second posture P2 includes the filling operation to fill the liquid ejecting head 10 with the ink. In the liquid ejecting head 10 in the second posture P2, the liquid ejecting head 10 can be filled with the ink while circulating the ink. With this, the air bubbles in the common liquid chamber R can be discharged to the outside of the liquid ejecting head 10 while filling the common liquid chamber R with the ink. Therefore, the risk that the air bubbles remain in the common liquid chamber R is reduced. The risk that the air bubbles in the common liquid chamber R are drawn into the nozzle N or the pressure chamber C during the subsequent recording operation is suppressed.

The circulating operation performed in the second posture P2 includes the cleaning operation of the liquid ejecting head 10. In the liquid ejecting head 10 of the second posture P2, the cleaning operation can be executed while circulating the ink. With this, the air bubbles in the common liquid chamber R can be discharged to the outside of the liquid ejecting head 10 while the flow channel of the ink in the liquid ejecting apparatus 1 is cleaned. Therefore, the risk that the air bubbles remain in the common liquid chamber R is reduced. The risk that the air bubbles in the common liquid chamber R are drawn into the nozzle N or the pressure chamber C during the subsequent recording operation is suppressed. For example, the air bubbles can be discharged from the inside of the common liquid chamber R by executing the cleaning operation periodically. With the cleaning operation being executed when abnormality of the liquid ejecting head 10 is detected, the state of the ink in the flow channel can be improved and also the air bubbles can be discharged from the inside of the common liquid chamber R. For example, the viscosity of the ink may be improved by executing the cleaning operation.

In the second posture P2, the ejecting surface F1 is substantially parallel to the horizontal plane F0. With this, the flow direction of the ink in the common liquid chamber R is along the horizontal plane F0, and thus the air bubbles are likely to be discharged from the common liquid chamber R. In the liquid ejecting apparatus 1, since the ejecting surface F1 is substantially parallel to the horizontal plane F0 in the second posture P2, the performance of discharging the air bubbles can be uniform in the multiple head chips 20A to 20D.

The liquid ejecting head 10 includes the head chip 20A and the head chip 20B. In this case, the head chip 20A is an example of a "first head chip", and the head chip 20B is an example of a "second head chip".

The head chip 20A includes the common liquid chamber RA communicating with multiple nozzles NA, the ink supply port 46A to introduce the ink to the common liquid chamber RA, and the ink discharge port 47A to discharge the ink from the common liquid chamber RA. The ink supply port 46A is an example of a "first supply port", and the ink discharge port 47A is an example of a "first discharge port".

The head chip 20B includes the common liquid chamber RB communicating with multiple nozzles NB, the ink supply port 46B to introduce the ink to the common liquid chamber RB, and the ink discharge port 47B to discharge the ink from the common liquid chamber RB. The ink supply port 46B is an example of a "second supply port", and the ink discharge port 47B is an example of a "second discharge port".

The head chips 20A and 20B are arranged such that, in the first posture P1, the first flow direction in which the ink flows from the ink supply port 46A to the ink discharge port 47A and the second flow direction in which the ink flows from the ink supply port 46B to the ink discharge port 47B are opposite to each other. As illustrated in FIG. 4, the first flow direction is the Y1 direction, and the second flow direction is the Y2 direction. The Y1 direction is the opposite direction to the Y2 direction. The same applies to the head chips 20C and 20D. In the liquid ejecting apparatus 1 in the first posture P1, the first flow direction and the second flow direction cross an extending direction of an intersection line of the ejecting surface F1 and the horizontal plane F0. In the present embodiment, the extending direction of the intersection line of the ejecting surface F1 and the horizontal plane F0 is the X-axis direction. As illustrated in FIG. 8, the extending direction of the intersection line of the ejecting surface F1 and the horizontal plane F0 in the first posture P1 is the X-axis direction.

The first flow direction and the second flow direction are directions along the ejecting surface F1. As illustrated in FIG. 9, the ejecting surface F1 is along an XY plane. The XY plane is a plane along the X-axis direction and the Y-axis direction. The first flow direction and the second flow direction are along the Y-axis direction. As illustrated in FIG. 3, the direction in which the nozzle row NL extends is the Y-axis direction.

As illustrated in FIG. 4, in the liquid ejecting head 10, the head chip 20A and the head chip 20B are adjacent to each other, and the ink supply port 46A is arranged closer to the ink supply port 46B than to the ink discharge port 47B.

In the liquid ejecting head 10, the head chip 20B and the head chip 20C are adjacent to each other, and the ink discharge port 47B is arranged closer to the ink discharge port 47C than to the ink supply port 46C.

In the liquid ejecting head 10, the head chip 20C and the head chip 20D are adjacent to each other, and the ink supply port 46C is arranged closer to the ink supply port 46D than to the ink discharge port 47D.

In the liquid ejecting heads 10 adjacent to each other in the Y-axis direction, the head chip 20D of one liquid ejecting head 10 and the head chip 20A of the other liquid ejecting head 10 are adjacent to each other, and the ink discharge port 47D of the one liquid ejecting head 10 is arranged closer to the ink discharge port 47A of the other liquid ejecting head 10 than to the ink supply port 46A thereof.

According to the liquid ejecting apparatus 1 including such a liquid ejecting head 10, the ink supply ports 46A to 46D are arranged close to each other, and the ink discharge ports 47A to 47D are arranged close to each other; thus, a variation in the ink weight ejected from the nozzles N of the adjacent head chips 20 is reduced. With this, although the directions of the ink flows in the common liquid chambers R of the adjacent head chips 20 are opposite directions, the air bubbles can be discharged uniformly from the common liquid chambers R of the adjacent head chips 20 by executing the circulating operation in the second posture P2.

Figure 11:
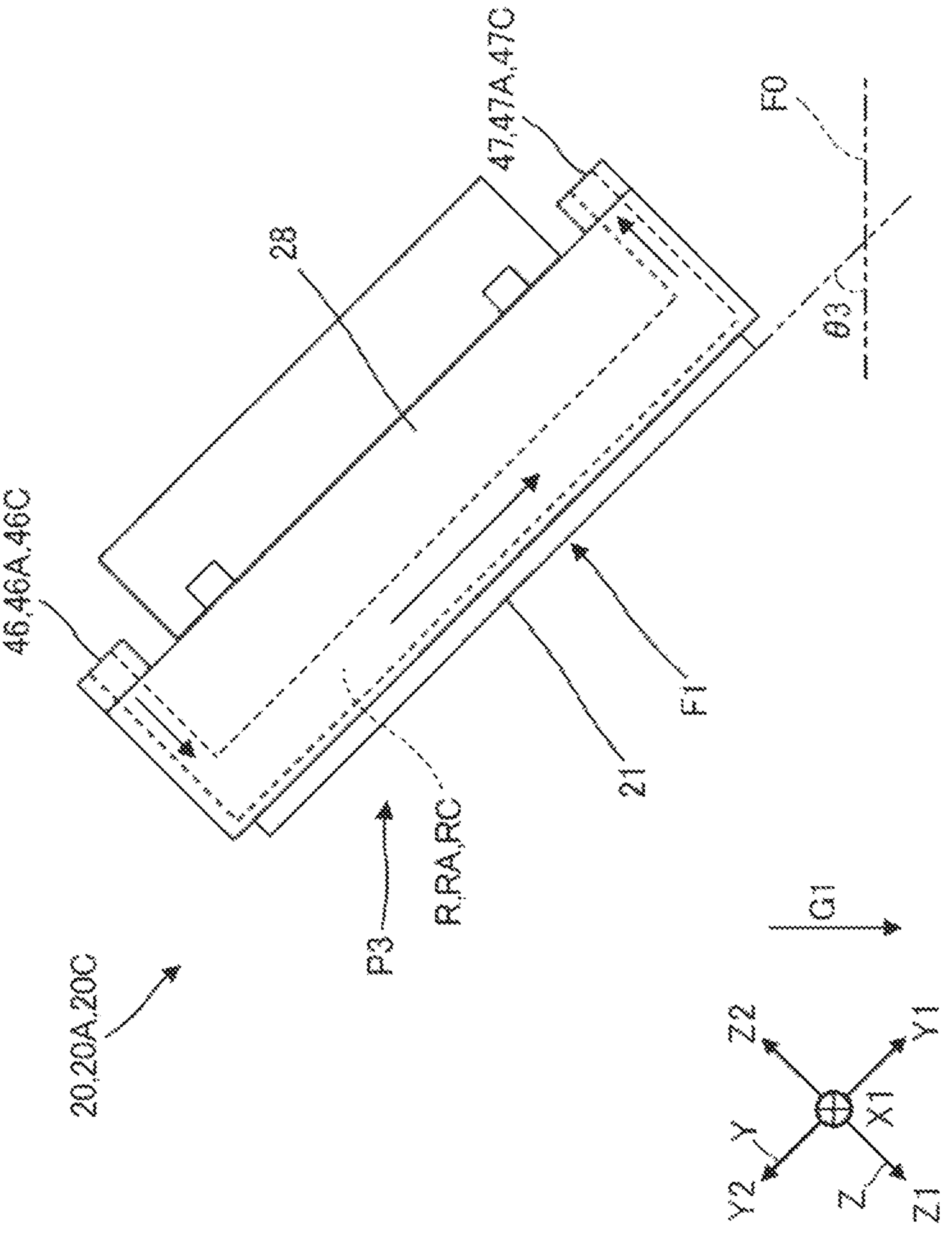
FIG. 11 is a side view illustrating a first posture of a head chip according to Modification 1.

A first posture P3 of the liquid ejecting head 10 according to Modification 1 is described with reference to FIG. 11. FIG. 11 is a side view illustrating the first posture P3 of the head chip 20 according to Modification 1. In FIG. 11, the head chips 20A and 20C in the first posture P3 are illustrated. The head chip 20 in the first posture P3 according to Modification 1 is inclined at an angle θ3 different from that of the head chip 20 in the first posture P1 according to Embodiment 1. The angle θ3 made by the ejecting surface F1 and the horizontal plane F0 in the first posture P3 may be 45 degrees, for example. The angle θ3 is an angle greater than the angle θ2 and is an angle smaller than the angle θ1. Thus, the angle θ3 in the first posture P3 may be an angle smaller than 90 degrees.

Figure 12:
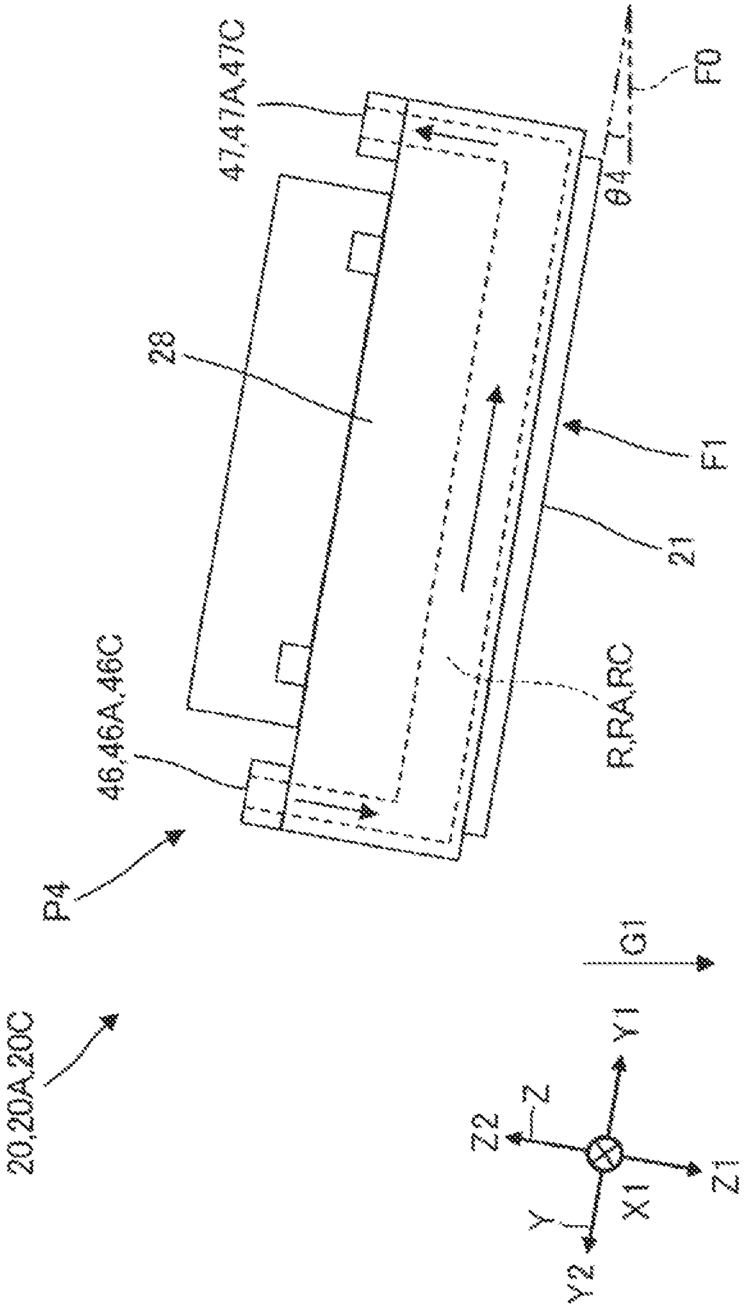
FIG. 12 is a side view illustrating a second posture of a head chip according to Modification 2.

A second posture P4 of the liquid ejecting head 10 according to Modification 2 is described with reference to FIG. 12. FIG. 12 is a side view illustrating the head chip 20 in the second posture P4 according to Modification 2. In FIG. 12, the head chips 20A and 20C in the second posture P4 are illustrated. The head chip 20 in the second posture P4 according to Modification 2 is inclined at an angle θ4 different from that of the head chip 20 in the second posture P2 according to Embodiment 1. The angle θ4 made by the ejecting surface F1 and the horizontal plane F0 in the second posture P4 may be 10 degrees, for example. The angle θ4 may be an angle greater than the angle θ2 and may be an angle smaller than the angle θ3. Thus, the angle θ4 in the second posture P4 may be an angle greater than 0 degrees. In the liquid ejecting apparatus 1 according to the modification, the circulating operation can be executed in the head chip 20 in the second posture P4. When the angle θ4 is smaller than the angles θ1 and θ3, the air bubbles in the common liquid chamber R are likely to be discharged more with the head chip 20 in the second posture P4 than that in the first posture P1 or P3.

Figure 13:
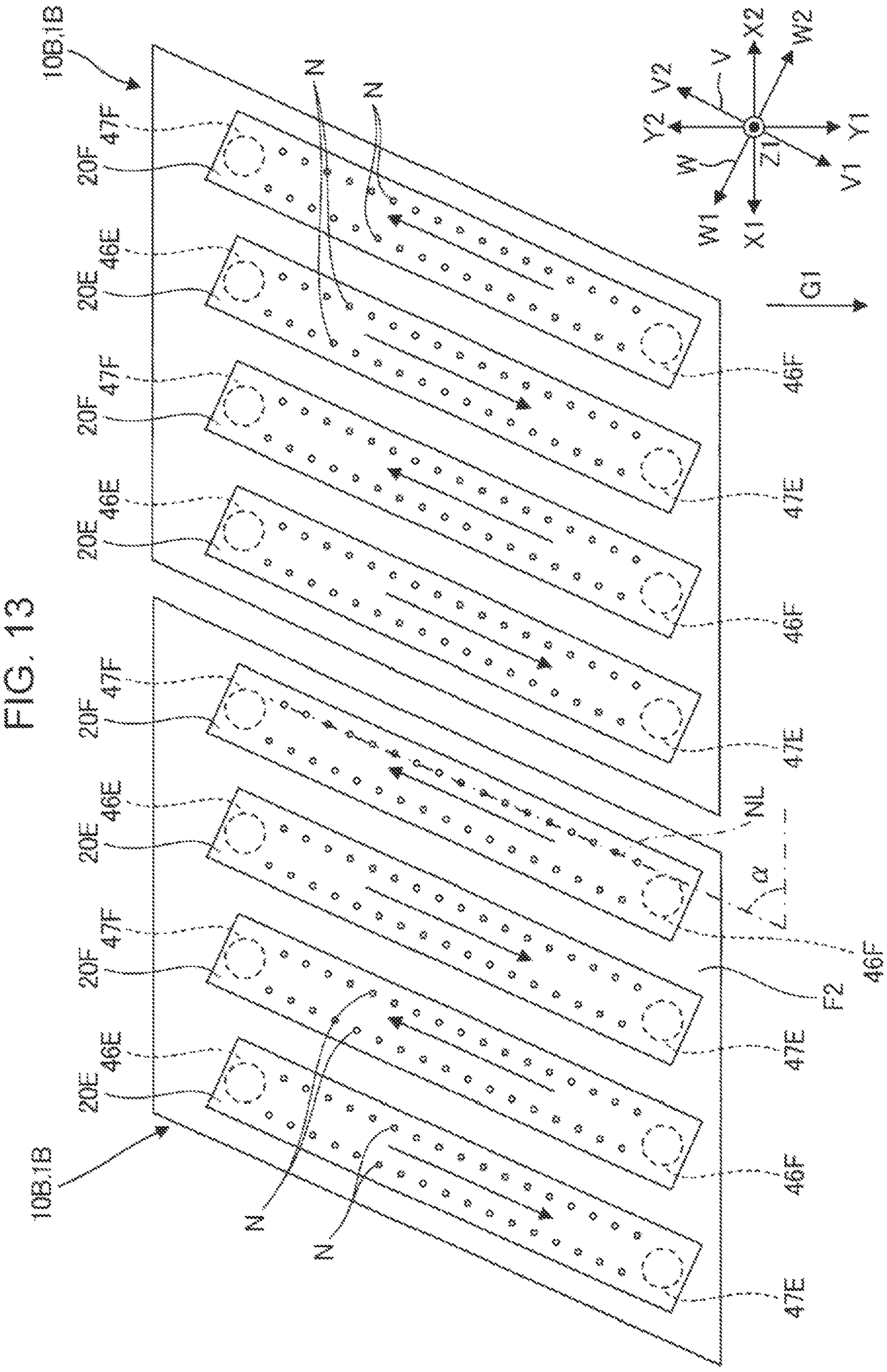
FIG. 13 is a bottom view illustrating a liquid ejecting head according to Embodiment 2.

A liquid ejecting head 10B according to Embodiment 2 is described. FIG. 13 is a bottom view illustrating the liquid ejecting head 10B according to Embodiment 2. The liquid ejecting head 10B illustrated in FIG. 13 illustrates a bottom view in a state of the first posture P1. FIG. 13 illustrates a V-axis direction and a W-axis direction. The V-axis direction and the W-axis direction are directions crossing each other when viewed in the Z-axis direction. The V-axis direction is inclined at a predetermined angle with respect to the Y-axis direction. The V-axis direction includes a V1 direction and a V2 direction that are directions opposite to each other. The W-axis direction is inclined at a predetermined angle α with respect to the X-axis direction. The W-axis direction includes a W1 direction and a W2 direction.

A liquid ejecting apparatus 1B according to Embodiment 2 includes the multiple liquid ejecting heads 10B. The liquid ejecting apparatus 1B according to Embodiment 2 is different from the liquid ejecting apparatus 1 according to Embodiment 1 in that the liquid ejecting apparatus 1B according to Embodiment 2 includes the liquid ejecting head 10B instead of the liquid ejecting head 10. In the descriptions of Embodiment 2, a similar description as that of Embodiment 1 may be omitted.

The liquid ejecting head 10B includes multiple head chips 20E and 20F. The head chips 20E and 20F extend in the V-axis direction. The head chips 20E and 20F each include the multiple nozzles N. The multiple nozzles N form the nozzle row NL arrayed in the V-axis direction. Although it is not illustrated, common liquid chambers RE and RF of the head chips 20E and 20F extend in the V-axis direction and communicate with the multiple nozzles N commonly. That is, the ink in the common liquid chambers RE and RF flows along the V-axis.

The head chip 20E and the head chip 20F are arranged alternately in the X-axis direction. The head chip 20E includes an ink supply port 46E and an ink discharge port 47E communicating with the common liquid chamber RE.

The head chip 20F includes an ink supply port 46F and an ink discharge port 47F communicating with the common liquid chamber RF.

The ink supply port 46E is positioned in the Y2 direction from the ink discharge port 47E. The ink discharge port 47F is positioned in the Y2 direction from the ink supply port 46F.

As with Embodiment 1, the Y1 direction is along the gravity direction G1 in the first posture P1 of the liquid ejecting head 10B of the present embodiment. In the first posture P1 of the liquid ejecting head 10B, the ink in the common liquid chamber RE of the head chip 20E flows in the gravity direction G1, in other words, flows downward in the gravity direction G1 when viewed in the X-axis direction. Specifically, in the first posture P1 of the liquid ejecting head 10B, the ink in the common liquid chamber RE of the head chip 20E flows along the V1 direction in the first posture P1. In the first posture P1 of the liquid ejecting head 10B, the ink in the common liquid chamber RF of the head chip 20F flows in the opposite direction to the gravity direction G1, in other words, flows upward in the gravity direction G1 when viewed in the X-axis direction. Specifically, in the first posture P1 of the liquid ejecting head 10B, the ink in the common liquid chamber RF of the head chip 20F flows in the V2 direction in the first posture P1.

As with Embodiment 1, the Y-axis direction is arranged along the horizontal plane F0 in the second posture P2 of the liquid ejecting head 10B in the present embodiment. The horizontal plane F0 is illustrated in FIG. 10. In the second posture P2 of the liquid ejecting head 10B, the ejecting surface F2 is along the horizontal plane F0. The flows of the ink in the common liquid chambers RE and RF in the head chips 20E and 20F are along the horizontal plane F0.

The liquid ejecting apparatus 1B including such a liquid ejecting head 10B also executes the recording operation in the first posture P1 and executes the circulating operation in the second posture P2. The liquid ejecting apparatus 1B according to Embodiment 2 also achieves effects and operations similar to that of the liquid ejecting apparatus 1 of Embodiment 1.

Figure 14:
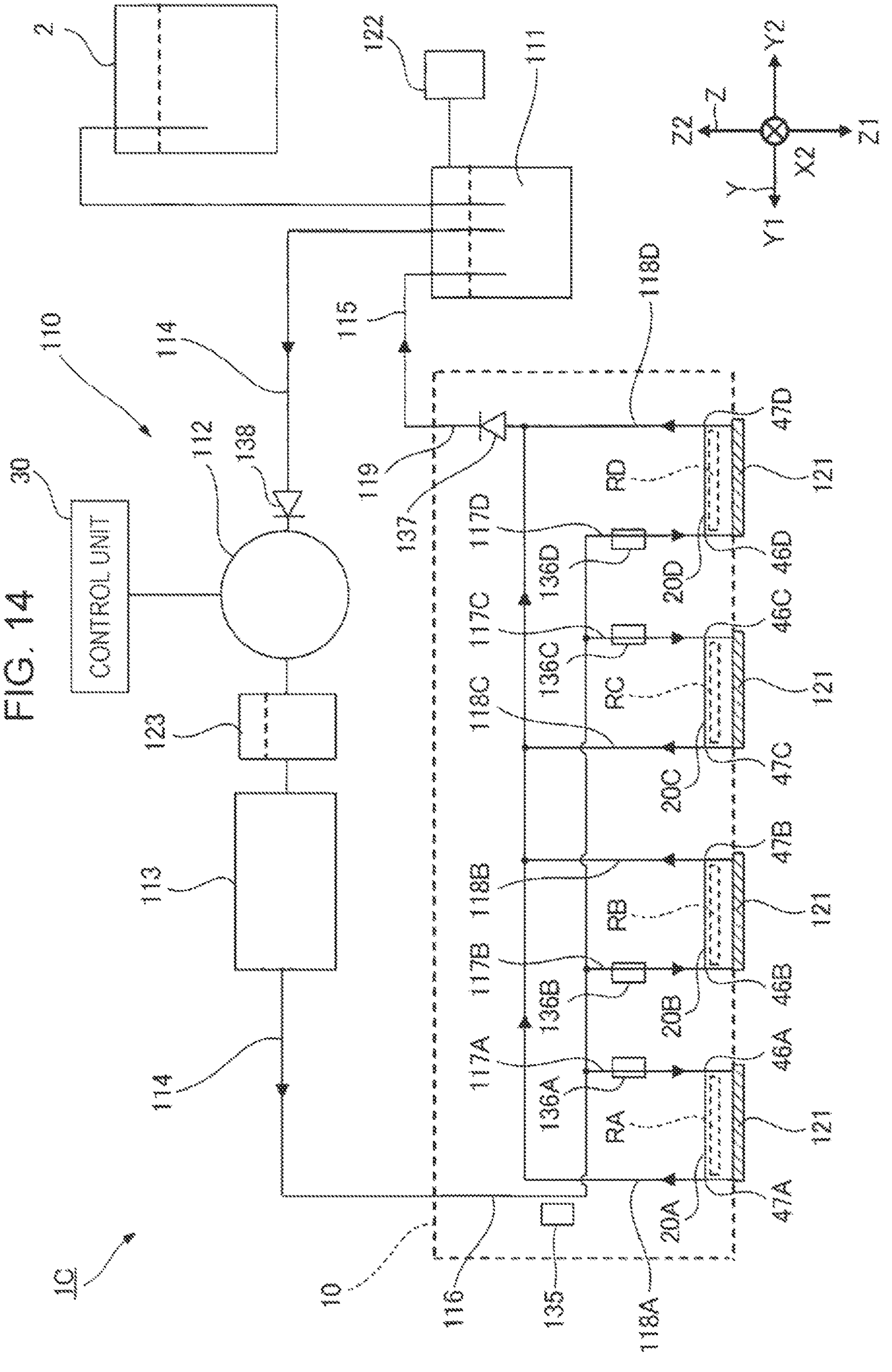
FIG. 14 is a schematic diagram illustrating an ink flow channel in a liquid ejecting apparatus according to Embodiment 3.

A liquid ejecting apparatus 1C according to Embodiment 3 is described with reference to FIG. 14. FIG. 14 is a schematic diagram illustrating an ink flow channel in the liquid ejecting apparatus 1C according to Embodiment 3. The liquid ejecting apparatus 1C of Embodiment 3 is different from Embodiment 1 illustrated in FIG. 1 in that the liquid ejecting apparatus 1C of Embodiment 3 includes a blocking member 121, a negative pressure generating unit 122, and a tank 123.

The liquid ejecting apparatus 1C includes the blocking member 121. The blocking member 121 is in a plate shape, for example, and blocks the multiple nozzles N formed in the ejecting surface F1. The blocking member 121 can be brought into contact with the ejecting surface F1. The blocking member 121 may be formed of rubber, for example, or may be formed of another material. The blocking member 121 may have a structure including multiple projecting portions insertable to the multiple nozzles N. For example, the blocking member 121 and the ejecting surface F1 can be in contact with each other by the liquid ejecting head 10 being moved. The blocking member 121 may be in contact with the ejecting surface F1 by being moved.

The liquid ejecting apparatus 1C includes the negative pressure generating unit 122. The negative pressure generating unit 122 of the present embodiment is coupled to the sub tank 111 and can make the pressure in the sub tank 111 negative. The negative pressure generating unit 122 may have a similar configuration as that of the pressure adjusting unit 111*b* of Embodiment 1. The negative pressure generating unit 122 includes a compressor, for example. The negative pressure generating unit 122 may be directly coupled to the sub tank 111 or may be coupled to the sub tank 111 through another flow channel. The negative pressure generating unit 122 may be provided in the middle of the ink discharge flow channel 115, not the sub tank 111. The negative pressure generating unit 122 is not limited to a compressor and may be another sucking pump such as a tube pump, a syringe pump, and a diaphragm pump.

The liquid ejecting apparatus 1C includes the tank 123. The tank 123 is coupled between the pump 112 and the temperature adjusting unit 113, for example. The tank 123 temporarily reserves the ink. The ink in the tank 123 is supplied to the liquid ejecting head 10 through the ink supply flow channel 114. The tank 123 may be coupled between the temperature adjusting unit 113 and the liquid ejecting head 10.

The liquid ejecting apparatus 1C includes a check valve 138. The check valve 138 is provided in the ink supply flow channel 114 between the sub tank 111 and the pump 112. The check valve 138 can prevent a backflow of the ink from the pump 112 toward the sub tank 111. With this, the pressure in the liquid ejecting head 10 can be made negative effectively through the sub tank 111 by driving the negative pressure generating unit 122.

The liquid ejecting apparatus 1C may not include the check valve 138. The liquid ejecting apparatus 1C may have a configuration including an opening/closing valve instead of the check valve 138. The backflow of the ink into the sub tank 111 may be prevented by closing the opening/closing valve when the negative pressure generating unit 122 is driven, or the pump 112 may be capable of preventing the backflow of the ink to the sub tank 111. For example, the backflow of the ink to the sub tank 111 can be prevented by the pump 112 that is a tube pump.

Such a liquid ejecting apparatus 1C according to Embodiment 3 includes the blocking member 121 that can be brought into contact with the ejecting surface F1. The liquid ejecting head 10 includes a filter 136A arranged upstream of the ink supply port 46A and a filter 136B arranged upstream of the ink supply port 46B. The filter 136A is an example of a "first filter", and the filter 136B is an example of a "second filter".

A circulating mechanism 110B includes the negative pressure generating unit 122 arranged downstream of the ink discharge ports 47A and 47B.

The circulating operation in the second posture P2 includes an operation to make the pressures inside the common liquid chambers RA and RB negative through the ink discharge ports 47A and 47B by driving the negative pressure generating unit 122 while blocking the multiple nozzles N with the blocking member 121.

According to such a liquid ejecting apparatus 1C, the filters 136A to 136D are provided in the head chips 20A to 20D, respectively, to be a resistance to the flow of the ink, and also the multiple nozzles N are blocked by the blocking member 121; thus, the insides of the common liquid chambers RA to RD can be efficiently depressurized by driving the negative pressure generating unit 122. With this, the sizes of the air bubbles in the common liquid chambers RA to RD can be increased, and such air bubbles with increased volumes are likely to be drawn toward the ink discharge port 47. The air bubbles with large volumes are more likely to be drawn by the negative pressure generating unit 122 than the air bubbles with small volumes are. Therefore, the air bubbles are likely to be discharged from the common liquid chambers RA to RD.

The control unit 30 does not perform pressurization from upstream of the head chips 20A to 20D during the circulating operation in the second posture P2. Upstream of the head chips 20A to 20D includes upstream of the liquid ejecting head 10. Upstream of the liquid ejecting head 10 includes the ink supply flow channel 114 between the sub tank 111 and the liquid ejecting head 10. The control unit 30 does not performs the pressurization by the pump 112 provided upstream of the head chips 20A to 20D during the circulating operation in the second posture P2. With this, the ink flowing in from upstream of the head chips 20A to 20D is reduced more than a case of performing the circulating operation while pressurizing the pump 112, and thus the insides of the common liquid chambers RA to RD are likely to be depressurized. Therefore, with the volumes of the air bubbles in the common liquid chambers RA to RD being increased, the air bubbles are likely to be drawn to a side close to the negative pressure generating unit 122 and are likely to be discharged from the common liquid chambers RA to RD.

In the liquid ejecting apparatus 1C, there are no filters between the ink discharge port 47A to 47D and the negative pressure generating unit 122. In the liquid ejecting head 10, the filters 136A to 136D are arranged upstream of the head chips 20A to 20D, and there are no filters downstream of the head chips 20A to 20D. The filter 136 is not provided in each of the flow channels 118A to 118D, the flow channel 119, and the ink discharge flow channel 115. If there are the filters 136A to 136D between the ink discharge ports 47A to 47D and the negative pressure generating unit 122, the insides of the common liquid chambers RA to RD are less likely to be depressurized; however, since there are no filters in the flow channels between the ink discharge ports 47A to 47D and the negative pressure generating unit 122 in the liquid ejecting apparatus 1C, the common liquid chambers RA to RD are likely to be depressurized by the negative pressure generating unit 122. As a result, with the liquid ejecting apparatus 1C, the air bubbles in the common liquid chambers RA to RD are likely to be discharged.

Figure 15:
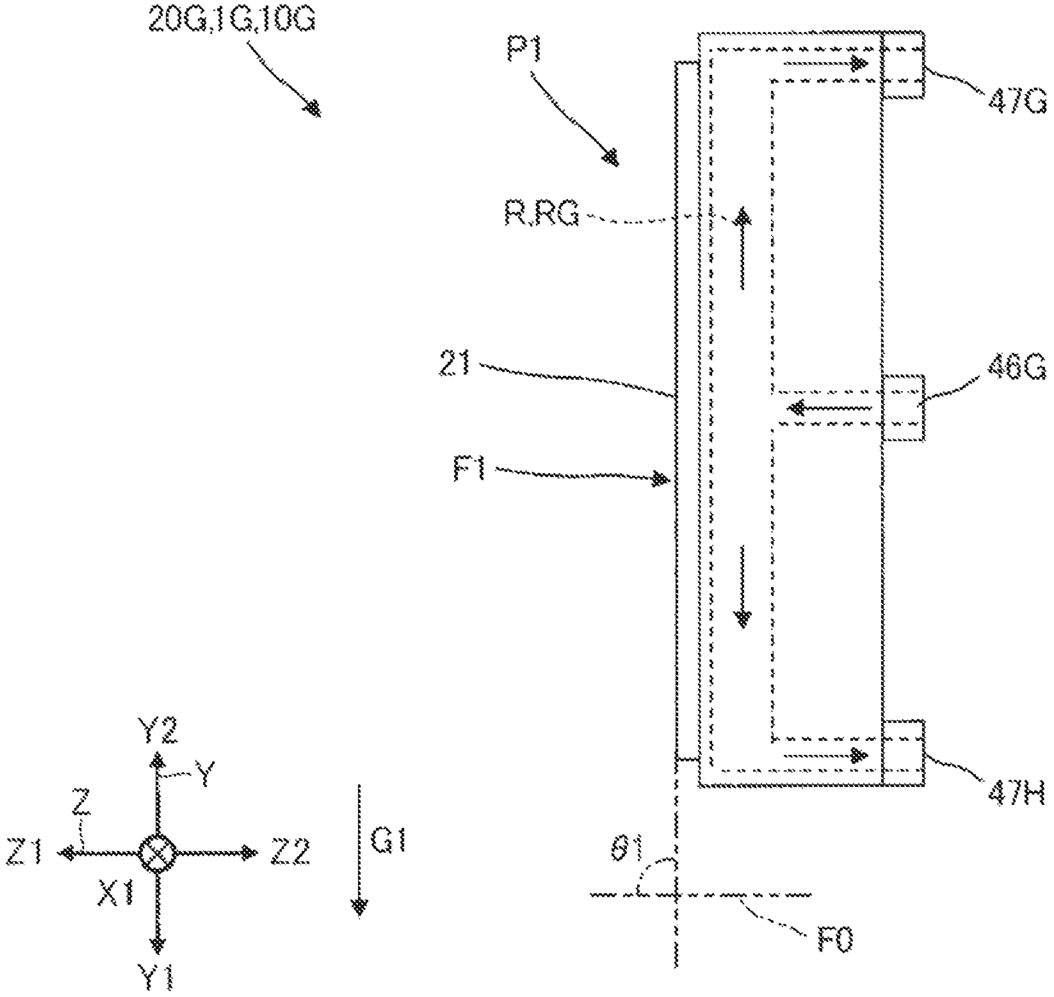
FIG. 15 is a side view illustrating a first posture of a head chip according to Embodiment 4.
Figure 16:
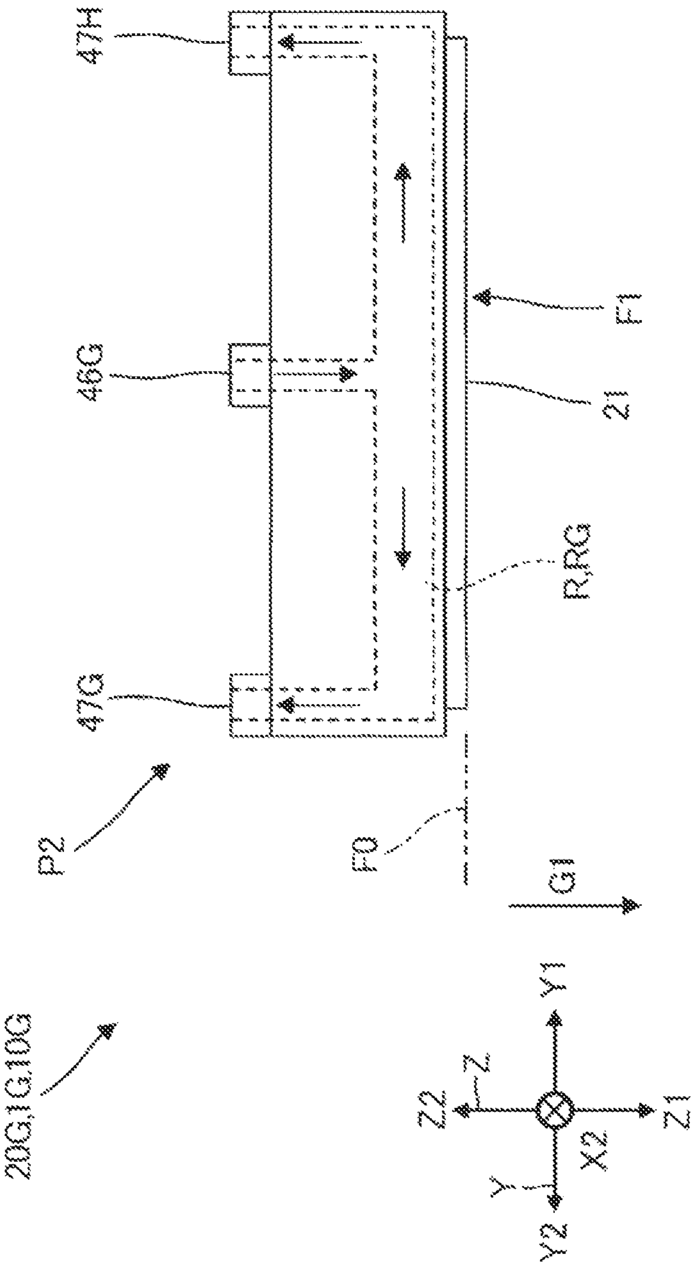
FIG. 16 is a side view illustrating a second posture of the head chip according to Embodiment 4.

A liquid ejecting apparatus 1G according to Embodiment 4 is described with reference to FIGS. 15 and 16. FIG. 15 is a side view illustrating the first posture P1 of a head chip 20G according to Embodiment 4. FIG. 16 is a side view illustrating the second posture P2 of the head chip 20G according to Embodiment 4. The liquid ejecting apparatus 1G includes a liquid ejecting head 10G including the multiple head chips 20G. The liquid ejecting apparatus 1G is different from the liquid ejecting apparatus 1 according to Embodiment 1 in that the liquid ejecting apparatus 1G includes the liquid ejecting head 10G including the head chips 20G instead of the liquid ejecting head 10 including the head chips 20A to 20D. In the descriptions of the liquid ejecting apparatus 1G according to Embodiment 4, similar descriptions as that of Embodiment 1 may be omitted.

The liquid ejecting head 10G may have a configuration including the single head chip 20G or may have a configuration including the multiple head chips 20G. Each head chip 20G includes a common liquid chamber RG communicating with the multiple nozzles N commonly. The configuration of the head chip 20G is substantially the same as that of the head chip 20 illustrated in FIG. 7 except a supply port 46G, discharge ports 47G and 47H, and the common liquid chamber RG.

As illustrated in FIGS. 15 and 16, the head chip 20G includes the supply port 46G, the discharge port 47G, and the discharge port 47H. Those supply port 46G, discharge port 47G, and discharge port 47H communicate with the common liquid chamber RG. The supply port 46G is coupled with an ink supply flow channel. The discharge ports 47G and 47H are coupled with an ink discharge flow channel. The ink in the ink supply flow channel is supplied to the inside of the common liquid chamber RG from the supply port 46G. The ink in the common liquid chamber RG is discharged from the discharge ports 47G and 47H and flows into the ink discharge flow channel.

The supply port 46G is positioned between the discharge port 47G and the discharge port 47H in the Y-axis direction. The discharge port 47G is positioned in the Y2 direction from the supply port 46G. The discharge port 47H is positioned in the Y1 direction from the supply port 46G.

A part of the ink flowing from the supply port 46G flows inside the common liquid chamber RG in the Y2 direction and is discharged from the discharge port 47G. A part of the ink flowing from the supply port 46G flows inside the common liquid chamber RG in the Y1 direction and is discharged from the discharge port 47H. The liquid ejecting apparatus 1G executes the recording operation in the first posture P1 and executes the circulating operation in the second posture P2. The liquid ejecting apparatus 1G discharges the air bubbles in the common liquid chamber RG from the discharge ports 47G and 47H by performing the circulating operation in the second posture P2.

The liquid ejecting apparatus 1G includes the liquid ejecting head 10G. The liquid ejecting head 10G includes the common liquid chamber RG communicating with the multiple nozzles N, the supply port 46G to introduce the ink to the common liquid chamber RG, and the discharge ports 47G and 47H to discharge the ink from the common liquid chamber RG. In the first posture P1, the supply port 46G is arranged between the discharge port 47G and the discharge port 47H in the gravity direction G1. Thus, the liquid ejecting apparatus 1G may have a configuration including the liquid ejecting head 10G. In the liquid ejecting apparatus 1G, since the circulating operation can be executed in the second posture P2, the flow of the ink in the common liquid chamber RG is along the horizontal plane F0. Therefore, the air bubbles in the common liquid chamber RG are likely to be discharged.

When the circulating operation is performed in the first posture P1 illustrated in FIG. 15, the ink flowing from the supply port 46G flows into a center portion in the Y-axis direction and then diverges in the common liquid chamber RG. A part of the ink flowing from the supply port 46G flows in the Y2 direction, in other words, in the opposite direction to the gravity direction G1 in the common liquid chamber RG, and a part of the rest of the ink flowing from the supply port 46G flows in the Y1 direction, in other words, in the gravity direction G1 in the common liquid chamber RG. For example, although the air bubbles in a lower portion in the common liquid chamber RG are pushed in the Y1 direction with the flow of the ink in the Y1 direction, the buoyancy in the Y2 direction acts on the air bubbles. Therefore, since the buoyancy in the opposite direction to the ink in the Y1 direction acts on the air bubbles in the common liquid chamber RG, there is a problem that the air bubbles are less likely to be discharged from the common liquid chamber RG. For example, in the center portion of the common liquid chamber RG, there is a risk that the air bubbles accumulate in a converging portion of the ink flowing from the supply port 46G. In the liquid ejecting apparatus 1G according to Embodiment 4, since the circulating operation is executed in the second posture P2 illustrated in FIG. 16, the air bubbles in the common liquid chamber RG flow in a direction along the horizontal plane F0 and are likely to be discharged from the discharge ports 47G and 47H.

Embodiments described above merely indicate a representative mode of the present disclosure. The present disclosure is not limited to Embodiments described above, and various changes and additions are possible without departing from the gist of the present disclosure.

In Embodiments described above, the flow direction of the ink in the common liquid chamber R in the second posture P2 is described as a direction along the horizontal plane F0; however, the flow direction of the ink in the common liquid chamber R is not limited thereto. The flow of the ink in the common liquid chamber R in the second posture P2 may not be along the horizontal plane F0. The flow of the ink in the common liquid chamber R in the second posture P2 may include a flow in a direction not along the horizontal plane F0.

In Embodiments described above, a case in which the ink supply port 46B is arranged in a position close to the ink supply port 46A is exemplified; however, the arrangement of the head chips 20A and 20B is not limited thereto. The ink discharge port 47B may be arranged in a position close to the ink supply port 46A, or the ink discharge port 47A may be arranged in a position close to the ink supply port 46B.

In the liquid ejecting apparatus 1C illustrated in FIG. 14, a case in which the multiple blocking members 121 are arranged for the respective head chips 20 is described; however, a blocking member 121 may be arranged to be brought into contact with the ejecting surfaces F1 of the multiple head chips 20.

In Embodiments described above, the circulating operation may be performed during the recording operation in the first posture P1. That is, both the circulating operation in the second posture P2 to discharge the air bubbles from the inside of the common liquid chamber R and circulating operation performed during the recording operation in the first posture P1 may be executed.

In Embodiments described above, the serial type liquid ejecting apparatus 1 that reciprocates, in the width direction of the medium PA, the carriage in which the liquid ejecting head 10 is mounted is exemplified; however, the present disclosure may also be applied to a line type liquid ejecting apparatus including the multiple liquid ejecting heads 10.

The liquid ejecting apparatus 1 exemplified in Embodiments described above can be employed in not only a device dedicated to printing but also various devices such as a facsimile apparatus and a copier. Application of the liquid ejecting apparatus of the present disclosure is not limited to printing. For example, a liquid ejecting apparatus that ejects a liquid solution of color material is used as a manufacturing apparatus that forms a color filter of a display apparatus such as a liquid crystal display panel. A liquid ejecting apparatus that ejects a liquid solution of conductive material is used as a manufacturing apparatus that forms wiring and an electrode of a wiring substrate. A liquid ejecting apparatus that ejects a liquid solution of an organic matter related to a living organism is used as a manufacturing apparatus that manufactures a biochip, for example.

What is claimed is:

1. A liquid ejecting apparatus, comprising:

a liquid ejecting head including an ejecting surface configured to eject a liquid;

a tank that reserves the liquid to be supplied to the liquid ejecting head;

a circulating mechanism that executes a circulating operation to circulate the liquid between the liquid ejecting head and the tank; and a control unit that controls the circulating mechanism, wherein the control unit executes a recording operation by the liquid ejecting head in a first posture in which the ejecting surface crosses a horizontal plane and executes the circulating operation in a second posture in which an angle made by the ejecting surface and the horizontal plane is smaller than the angle in the first posture, the liquid ejecting head includes:

a first common liquid chamber communicating with first nozzles;

a first supply port introducing the liquid to the first common liquid chamber;

a first discharge port discharging the liquid from the first common liquid chamber;

a second common liquid chamber communicating with second nozzles;

a second supply port introducing the liquid to the second common liquid chamber; and a second discharge port discharging the liquid from the second common liquid chamber, and in the first posture, a first flow direction in which the liquid flows from the first supply port to the first discharge port and a second flow direction in which the liquid flows from the second supply port to the second discharge port are opposite to each other.

2. The liquid ejecting apparatus according to claim 1, wherein the circulating operation performed in the second posture includes a filling operation to fill the liquid ejecting head with the liquid.

3. The liquid ejecting apparatus according to claim 1, wherein the circulating operation performed in the second posture includes a cleaning operation on the liquid ejecting head.

4. The liquid ejecting apparatus according to claim 1, wherein in the first posture, the ejecting surface and the horizontal plane cross each other substantially perpendicularly.

5. The liquid ejecting apparatus according to claim 1, wherein in the second posture, the ejecting surface is substantially parallel to the horizontal plane.

6. The liquid ejecting apparatus according to claim 1, wherein the liquid ejecting head includes:

a first head chip that includes the first common liquid chamber, the first supply port, and the first discharge port; and a second head chip that includes the second common liquid chamber, the second supply port, and the second discharge port.

7. The liquid ejecting apparatus according to claim 6, wherein the first head chip and the second head chip are adjacent to each other, and the first discharge port is arranged closer to the second discharge port than to the second supply port, or the first supply port is arranged closer to the second supply port than to the second discharge port.

8. The liquid ejecting apparatus according to claim 6, further comprising:

a blocking member configured to be brought into contact with the ejecting surface, wherein the liquid ejecting head includes a first filter arranged upstream of the first supply port and a second filter arranged upstream of the second supply port, the circulating mechanism includes a negative pressure generating unit arranged downstream of the first and second discharge ports, and the circulating operation in the second posture includes an operation to make a pressure inside the common liquid chambers negative through the first and second discharge ports by driving the negative pressure generating unit while the plurality of first nozzles and the plurality of second nozzles are blocked by the blocking member.

9. The liquid ejecting apparatus according to claim 8, wherein the control unit does not perform pressurization from upstream of the first and second head chips during the circulating operation in the second posture.

10. The liquid ejecting apparatus according to claim 8, wherein no filter is arranged between the first and second discharge ports and the negative pressure generating unit.

11. The liquid ejecting apparatus according to claim 1, wherein the first flow direction and the second flow direction are along the ejecting surface.

12. A liquid ejecting apparatus comprising:

a liquid ejecting head including an ejecting surface configured to eject a liquid;

a tank that reserves the liquid to be supplied to the liquid ejecting head;

a circulating mechanism that executes a circulating operation to circulate the liquid between the liquid ejecting head and the tank; and a control unit that controls the circulating mechanism, wherein the control unit executes a recording operation by the liquid ejecting head in a first posture in which the ejecting surface crosses a horizontal plane and executes the circulating operation in a second posture in which an angle made by the ejecting surface and the horizontal plane is smaller than the angle in the first posture, the liquid ejecting head includes a common liquid chamber communicating with nozzles, a supply port to introduce the liquid to the common liquid chamber, and a first discharge port and a second discharge port to discharge the liquid from the common liquid chamber, and in the first posture, the supply port is arranged between the first discharge port and the second discharge port in the gravity direction.

13. A liquid ejecting apparatus, comprising:

a liquid ejecting head including an ejecting surface configured to eject a liquid;

a tank that reserves the liquid to be supplied to the liquid ejecting head;

a circulating mechanism that executes a circulating operation to circulate the liquid between the liquid ejecting head and the tank; and a control unit that controls the circulating mechanism, wherein the control unit executes a recording operation by the liquid ejecting head in a first posture in which the ejecting surface crosses a horizontal plane and executes the circulating operation in a second posture in which an angle made by the ejecting surface and the horizontal plane is smaller than the angle in the first posture, the liquid ejecting head includes:

a common liquid chamber communicating with nozzles;

a supply port introducing the liquid to the common liquid chamber; and a discharge port discharging the liquid from the common liquid chamber, and in the first posture, the discharge port is positioned below the supply port in the gravity direction.

14. The liquid ejecting apparatus according to claim 13, wherein an interval in the gravity direction between the supply port and the discharge port in the second posture is shorter than an interval in the gravity direction between the supply port and the discharge port in the first posture.

* * * * *